(12) United States Patent
Asaba et al.

(10) Patent No.: US 7,521,659 B2
(45) Date of Patent: Apr. 21, 2009

(54) DRIVING AN IMAGE SENSOR WITH REDUCED AREA AND HIGH IMAGE QUALITY

(75) Inventors: Tetsuo Asaba, Suwon-si (KR); Su-Hun Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/825,198

(22) Filed: Jul. 5, 2007

(65) Prior Publication Data

US 2008/0001067 A1  Jan. 3, 2008

Related U.S. Application Data

(63) Continuation-in-part of application No. 11/066,987, filed on Feb. 25, 2005, now Pat. No. 7,256,381, and a continuation-in-part of application No. 11/157,461, filed on Jun. 21, 2005.

(30) Foreign Application Priority Data

| Feb. 27, 2004 | (KR) | ................. | 2004-13575 |
| Jun. 22, 2004 | (KR) | ................. | 2004-46569 |
| Dec. 8, 2004 | (KR) | ................. | 2004-103097 |

(51) Int. Cl.
*H01L 27/00* (2006.01)
(52) U.S. Cl. ............. 250/208.1; 250/214.1; 250/214 R; 257/239; 348/294; 348/308
(58) Field of Classification Search ............. 250/208.1, 250/214.1, 214 R; 257/239; 348/294, 308
See application file for complete search history.

(56) References Cited

U.S. PATENT DOCUMENTS

2006/0113458 A1 * 6/2006 Yang et al. ................ 250/208.1

* cited by examiner

*Primary Examiner*—Seung C Sohn
(74) *Attorney, Agent, or Firm*—Monida H. Choi

(57) ABSTRACT

A solid-state image-sensing device includes a pixel array and an averaging unit. The pixel array includes a matrix of pixels and includes a respective output line for each of a plurality of pixel groupings such as for each column of pixels. The averaging unit receives respective signals from first and second output lines of the pixel array to generate a pulse width signal that indicates an average of such respective signals. A respective signal of the first output line is generated from combining photocurrents from a first set of at least two pixels sensing a same first color in the pixel array.

23 Claims, 17 Drawing Sheets

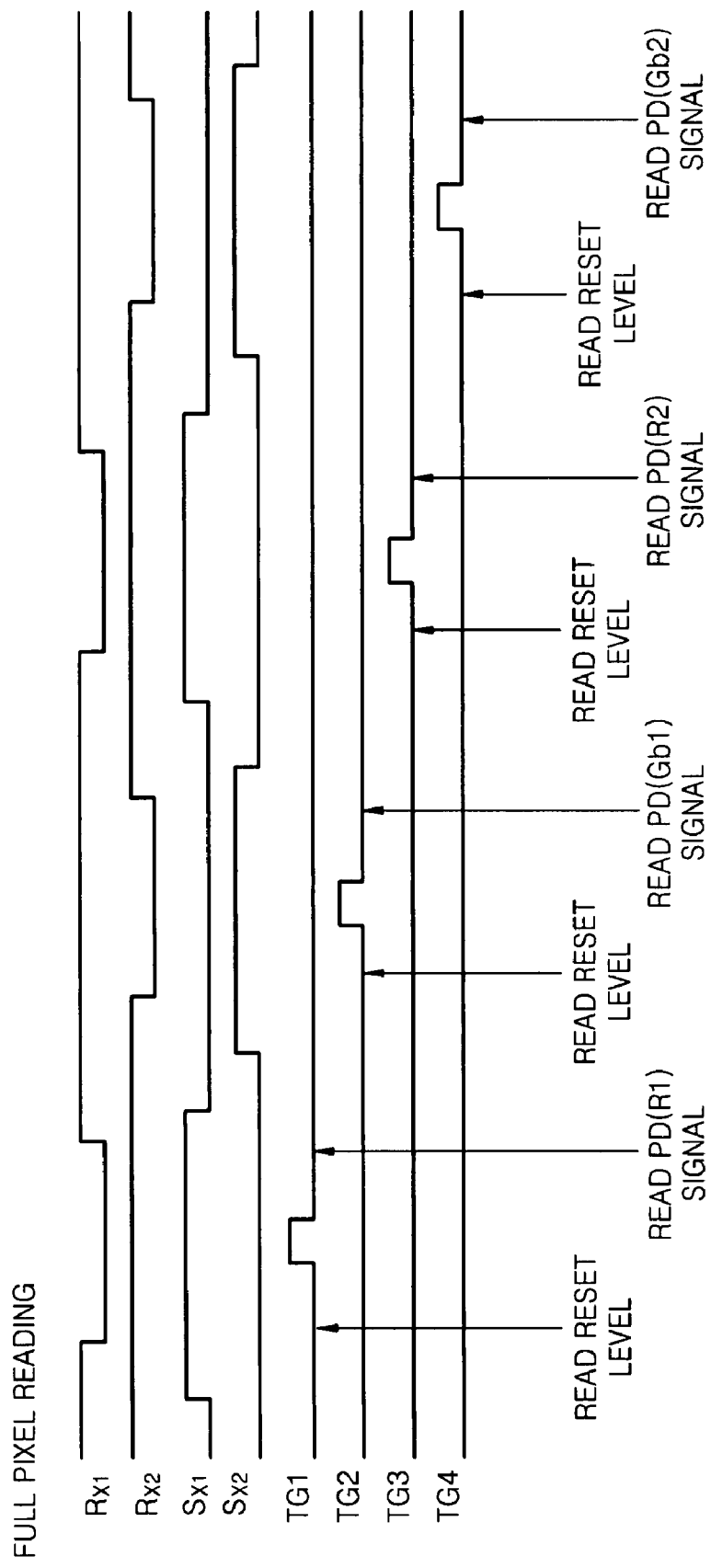

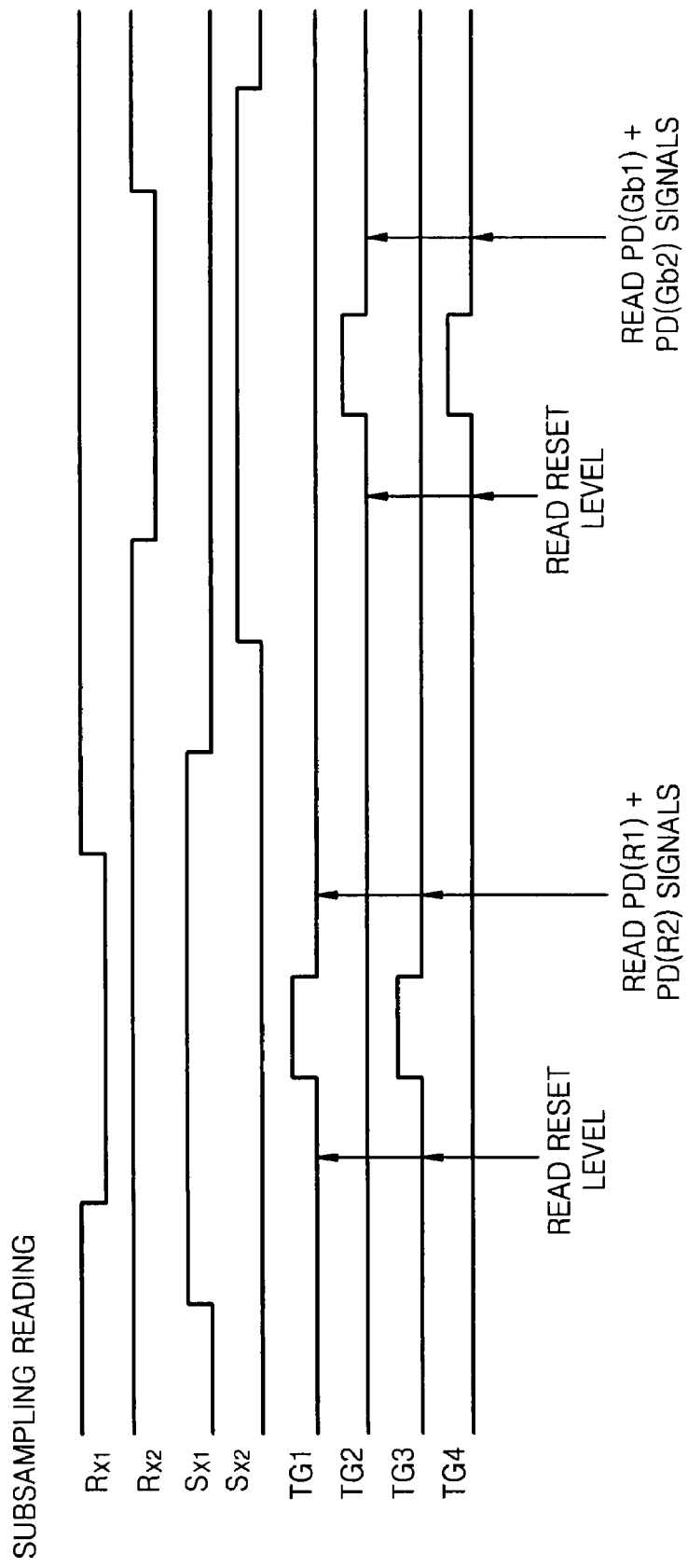

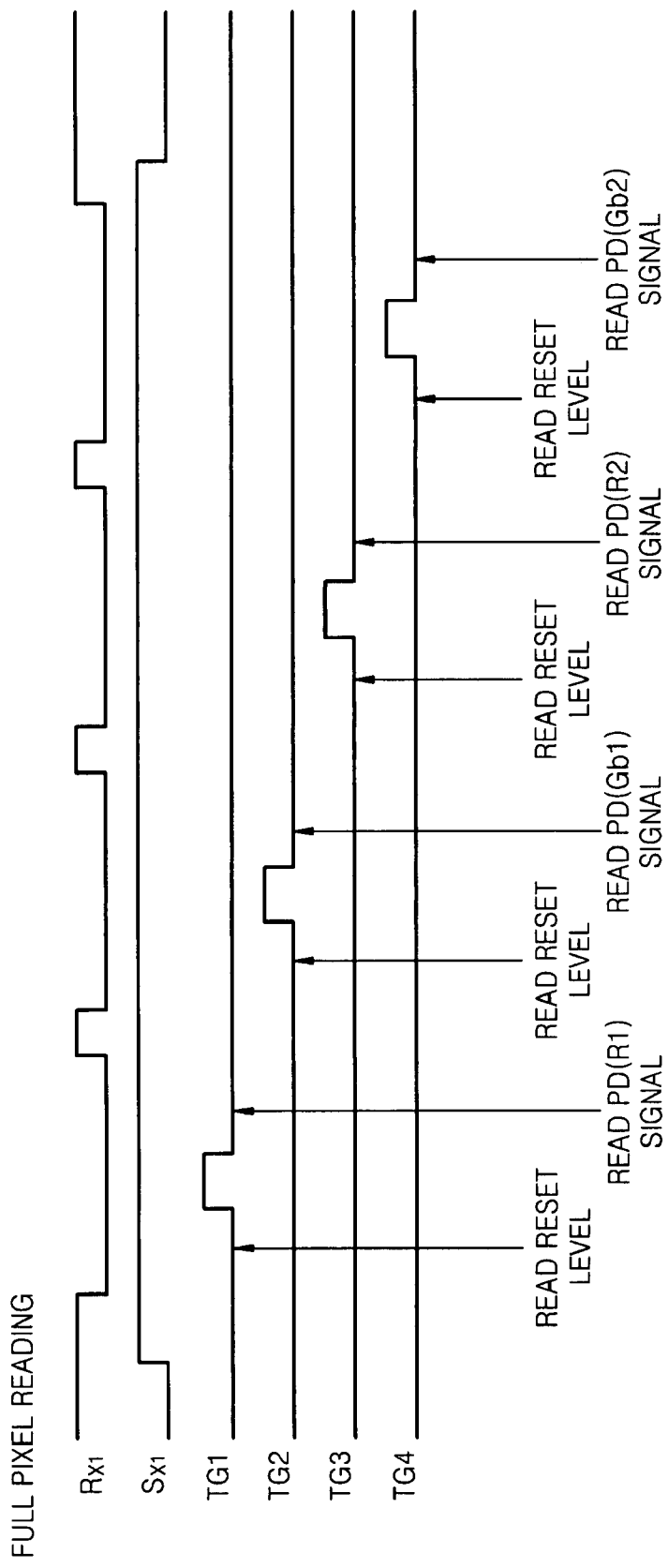

DRIVING AN IMAGE SENSOR WITH REDUCED AREA AND HIGH IMAGE QUALITY

The present application is a CIP (continuation-in-part) of an earlier filed patent application with Ser. No. 11/066,987 filed on Feb. 25, 2005 now U.S. Pat. No. 7,256,381, for which priority is claimed. This earlier filed patent application with Ser. No. 11/066,987 is in its entirety incorporated herewith by reference.

The present application is also a CIP (continuation-in-part) of an earlier filed copending patent application with Ser. No. 11/157,461 filed on Jun. 21, 2005, for which priority is claimed. This earlier filed copending patent application with Ser. No. 11/157,461 is in its entirety incorporated herewith by reference.

The present application also claims priority under 35 USC §119 to Korean Patent Application No. 2004-13575, filed on Feb. 27, 2004, in the Korean Intellectual Property Office, the disclosure of which is incorporated herein in its entirety by reference. A certified copy of Korean Patent Application No. 2004-13575 is contained in the parent copending patent application with Ser. No. 11/066,987.

The present application also claims priority under 35 USC §119 to Korean Patent Application No. 2004-46569, filed on Jun. 22, 2004, in the Korean Intellectual Property Office, the disclosure of which is incorporated herein in its entirety by reference. A certified copy of Korean Patent Application No. 2004-46569 is contained in the parent copending patent application with Ser. No. 11/157,461.

The present application also claims priority under 35 USC §119 to Korean Patent Application No. 2004-103097, filed on Dec. 8, 2004, in the Korean Intellectual Property Office, the disclosure of which is incorporated herein in its entirety by reference. A certified copy of Korean Patent Application No. 2004-103097 is contained in the parent copending patent application with Ser. No. 11/157,461.

BACKGROUND OF THE INVENTION

1. Field of the Invention

The present invention relates generally to image sensors such as a CMOS (complementary metal oxide semiconductor) image sensor, and more particularly, to driving pixels of an image sensor with reduced area and high image quality.

2. Description of the Related Art

In general, a solid-state image-sensing device, such as a CMOS (complementary metal oxide semiconductor) image sensor (CIS) for example, is a semiconductor device that captures images by sensing light. The image sensor includes an array of hundreds of thousands to millions of pixels that convert light of an image into electrical signals. In addition, an analog-to-digital converter converts such electrical signals that are analog signals into digital signals that are then stored in data storage units.

Digital cameras, camcorders, and the like currently commercially available are desired to capture both still and moving images. Thus, an image sensor with millions of pixels, which is suitable for capturing a still image, is also desired to be used for capturing a moving image.

As technology advances, the number of pixels in the semiconductor image sensor is likely to increase. Conventionally, capturing a still image or a moving image using one high resolution semiconductor image sensor such as a CMOS image sensor is performed in two ways.

According to one method, photocurrents from all pixels of the CMOS image sensor are measured to capture a still image. For capturing a moving image, photocurrents from selected pixels at predetermined intervals in the array of pixels are measured to capture the moving image. However, ignoring data from the non-selected pixels degrades the image quality of the moving image.

FIG. 1 is a block diagram of a conventional CIS type solid-state image-sensing device 100. Referring to FIG. 1, the conventional CIS type solid-state image-sensing device 100 includes an active pixel sensor (APS) array 110 having a matrix of pixels, a row driver 120, and an analog-to-digital conversion unit 130.

The row driver 120 receives a control signal from a row decoder (not shown), and the analog-to-digital conversion unit 130 receives a control signal from a column decoder (not shown). The solid-state image-sensing device 100 further includes a controller (not shown) that generates timing control signals and addressing signals for outputting selected and sensed video signals from each pixel of the APS array.

In the solid-state image-sensing device 100, a respective color filter is disposed over each pixel of the APS array 110 such that only light of a specific color is input to each pixel. To construct color signals, at least three kinds of color filters are arranged on the APS array 110. A general color filter array has a Bayer color pattern in which red and green color filters are alternately disposed along one row, and in which green and blue color filters are alternately disposed along the next row. Here, green which is closely related to a luminance signal is arranged in all rows with red and blue being alternately arranged in the rows to improve luminance resolution. A CIS having more than one million pixels is used in a digital still camera for improved resolution.

In the CIS type solid-state image-sensing device 100, the APS array 110 senses light using photodiodes and converts the sensed light into electric signals to generate image signals. The image signals output from the APS array 110 include red (R), green (G) and blue (B) analog signals. The analog-to-digital conversion unit 130 receives and converts such analog signals from the APS array 110 into digital signals.

When the CIS solid-state image-sensing device captures a still image, video signals from all pixels of the APS array 110 are output. In the sub-sampling mode, however, vertical resolution is reduced and video signals from a subset of the pixels of the APS array 110 are output and processed.

For example, a CIS type solid-state image-sensing device having an APS array with super extended graphic adapter (SXGA) resolution outputs SXGA-grade image signals for capturing a still image. However, the solid-state image-sensing device outputs video graphic adapter (VGA)-grade video signals in sub-sampling mode operations including moving picture display, preview, and automatic focus.

In the sub-sampling mode of operation in the conventional CIS type solid-state image-sensing device 100, only image signals of selected rows and columns are output to the analog-digital conversion unit 130 to reduce resolution. Thus, some image data is not used in the sub-sampling mode which causes aliasing noise with oblique lines shown as zigzag on a display.

To remove such aliasing noise, a method of averaging image signals in a predetermined range has been proposed. For example, image signals are analog-averaged in a predetermined range before being output to the analog-to-digital conversion unit 130. Alternatively, digital signals from the analog-to-digital conversion unit 130 are averaged. However, such digital averaging requires a large-capacity memory with an increase of chip area and power consumption. Furthermore, for analog-averaging image signals sensed by pixels of the APS array, a single column requires two large capacitors for averaging reset signals and image signals resulting in increase in chip area. Such solid-state image-sensing devices with increased chip area and power consumption may not be amenable for small-size mobile devices.

Alternatively for reducing resolution, photocurrents of adjacent pixels are combined to capture a moving image such that data from a substantial portion of the APS array are not ignored for improving image quality. Nevertheless, a CMOS image sensor using primary color filters cannot use such a technique. Furthermore, even when the CIS has a shared floating diffusion (FD) pixel structure, since adjacent pixels have different color filters for a Bayer color pattern, photocurrent signals from adjacent pixels cannot be combined to represent a particular color.

FIG. 2 is a circuit diagram of the conventional APS array 110 of FIG. 1. The APS array 110 includes a plurality of pixels 101, 102, 103, 104, 105, 106, 107, and 108 and a plurality of signal converters 111, 112, 113, and 114. Each of the pixels 101, 102, 103, 104, 105, 106, 107, and 108 is arranged along rows and columns forming a matrix of pixels and converts a received light of a respective color into a corresponding photocurrent indicating the intensity of such received light. Each of the pixels 101, 102, 103, 104, 105, 106, 107, and 108 is comprised of a respective photodiode PD and a respective transfer MOSFET between the respective photodiode and one of the signal converters 111, 112, 113, and 114.

Each of the photodiodes PD is for receiving a respective color defined by a color filter disposed thereon. Photodiodes PD with a label R1 or R2 are for receiving red colored light, photodiodes PD with a label B1 or B2 are for receiving blue colored light, and photodiodes PD with a label Ga1, Ga2, Gb1, or Gb2 are for receiving green colored light. Each of the signal converters 111, 112, 113, and 114 converts photocurrent output from any of the pixels 101, 102, 103, 104, 105, 106, 107, and 108 coupled thereto into an output voltage Vout.

APS array 110 of FIG. 2 has a shared FD pixel structure in which each of the signal converters 111, 112, 113, and 114 is coupled to a corresponding pair of two adjacent pixels along a column of the array of pixels to reduce the area of the APS array 110. For capturing a still image, the two adjacent pixels connected to a signal converter separately and sequentially output a respective photocurrent to the signal converter.

APS array 110 has a Bayer color pattern with the pixels being for receiving alternating colors along a column or a row. Thus, the pixels 101, 102, 103, and 104 in the first column are for receiving lights of alternating colors of red, green, red, and green, respectively. Similarly, the pixels 105, 106, 107, and 108 in the second column are for receiving lights of alternating colors of green, blue, green, and blue, respectively.

Accordingly, in the APS array 110 of FIG. 2, each signal converter 111, 112, 113, or 114 is connected to two adjacent pixels with different color filters. Thus, such a signal converter cannot combine the photocurrent signals from such adjacent pixels for simplified signal processing. That is, for capturing the moving image, the CIS type solid-state image-sensing device 100 would process photocurrent data from a portion of the array of pixels selected at predetermined intervals or would separately measure the photocurrents for all pixels and perform an averaging through image signal processing (ISP).

However, capturing the moving image from photocurrents of a portion of the array of pixels results in low image quality. Alternatively, capturing the moving image by separately measuring the photocurrents for all pixels and averaging through ISP requires high frequency operation and high power consumption. Nevertheless, a shared FD pixel structure is desired for reducing the area of the solid-state image-sensing device 100.

Thus, a mechanism for driving the pixels of an image sensor having a shared FD pixel structure with high image quality is desired.

SUMMARY OF THE INVENTION

Accordingly, at least two pixels each sensing light of a same color are coupled to a common signal converter during the sub-sampling mode in embodiments of the present invention. In addition, further averaging is performed in correlated double sampling during the sub-sampling mode.

In a general aspect of the present invention, a solid-state image-sensing device includes a pixel array and an averaging unit. The pixel array includes a matrix of pixels and a respective output line for each of a plurality of pixel groupings such as for each column of pixels. The averaging unit receives respective signals from first and second output lines of the pixel array to generate a pulse width signal that indicates an average of such respective signals. A respective signal of the first output line is generated from combining photocurrents from a first set of at least two pixels sensing a same first color in the pixel array.

In another embodiment of the present invention, the solid-state image-sensing device further includes a digital signal output unit that generates a digital value corresponding to when the pulse width signal has a logical transition.

In a further embodiment of the present invention, the pixel array further includes a first signal converter coupled to the pixels of the first set. In that case, the solid-state image-sensing device further includes a driver that controls switching elements in the first set of pixels for simultaneously coupling a respective photocurrent from a respective photodiode for each pixel of the first set to the first signal converter that generates the respective signal of the first output line during a sub-sampling mode.

For example, the first output line generates a first reset signal and a first image signal, and the second output line generates a second reset signal and a second image signal. In that case, the pulse width signal indicates an average of a first difference between the first reset signal and the first image signal and a second difference between the second reset signal and the second image signal, during the sub-sampling mode.

In an example embodiment of the present invention, the respective photocurrents from the pixels of the first set are summed at different time points with different configuration of the pixels of the first set for generating the first reset signal and the first image signal during the sub-sampling mode.

In another embodiment of the present invention, the first set includes two pixels that are non-adjoining in a same column of the pixel array with another pixel for sensing a different color from the first color being disposed between the two pixels.

In a further embodiment of the present invention, the pixel array further includes a second set of at least two pixels sensing a second color and coupled to the first signal converter. In that case, the driver controls respective switching elements in the second set of pixels for simultaneously coupling a respective photocurrent from a respective photodiode for each pixel of the second set to the first signal converter during the sub-sampling mode. Alternatively, the driver controls the respective switching elements in the first set of pixels for separately coupling the respective photocurrent from the respective photodiode for each pixel of the first set to the first signal converter, during a normal mode of operation.

For example, the driver operates in the sub-sampling mode for capturing a moving image, and operates in the normal mode for capturing a still image. Alternatively, the driver operates in the sub-sampling mode for capturing a moving image or a still image.

In an example embodiment of the present invention, the pixel array has a Bayer color pattern, and the pixels from the first set and the pixels from the second set alternate along a column of the pixel array.

In another embodiment of the present invention, the pixel array further includes a second set of pixels for sensing a second color and coupled to a second signal converter. In that case, the driver controls switching elements in the second set of pixels for simultaneously coupling a respective photocurrent from a respective photodiode for each pixel of the second set to the second signal converter that generates the respective signal of the second output line during the sub-sampling mode. Alternatively, the driver controls the respective switching elements in the second set of pixels for separately coupling the respective photocurrent from the respective photodiode for each pixel of the second set to the second signal converter that generates the respective signal of the second output line during the normal mode of operation.

In a further embodiment of the present invention, the averaging unit includes first and second correlated double sampling (CDS) units and a mode switch. The first CDS unit is coupled to the first output line and has a first set of amplifiers and capacitors. The second CDS unit is coupled to the second output line and has a second set of amplifiers and capacitors. The mode switch electrically couples inputs between the first and second sets of amplifiers during the sub-sampling mode and disconnects such inputs between the first and second sets of amplifiers during the normal mode.

In addition, the averaging unit further includes a plurality of switches for configuring the first and second sets of amplifiers and capacitors such that the pulse width signal that indicates the average of the respective signals is generated by the first and second CDS units during the sub-sampling mode, and such that a separate respective pulse width signal is generated by each of the first and second CDS units during the normal mode. In that case, at least one of the first and second sets of amplifiers is selected to operate for generating the pulse width signal during the sub-sampling mode.

In an example embodiment of the present invention, the first set of pixels are along a first column of the pixel array, and the second set of pixels are along a second column that is one column away from the first column in the pixel array.

In a further embodiment of the present invention, the pixel array has a Complementary color pattern with the pixels of the first set being non-adjoining in a column with another two pixels for sensing complementary colors being alternately disposed with the pixels of the first set. Alternatively, the pixel array has a Honeycomb color pattern with the pixels of the first set being disposed along one column of the pixel array.

The present invention may be used to particular advantage when the solid-state image-sensing device is a CMOS (complementary metal oxide semiconductor) image sensor. However, the present invention may also be applied to other types of solid-state image-sensing devices.

BRIEF DESCRIPTION OF THE DRAWINGS

The above and other features and advantages of the present invention will become more apparent when described in detailed exemplary embodiments thereof with reference to the attached drawings in which:

FIGS. 5A and 5B are timing diagrams of control signals for driving the APS array of FIG. 4, according to an embodiment of the present invention;

FIGS. 7A and 7B are timing diagrams of control signals for driving the APS array of FIG. 6, according to an embodiment of the present invention;

The figures referred to herein are drawn for clarity of illustration and are not necessarily drawn to scale. Elements having the same reference number in FIGS. 1, 2, 3, 4, 5A, 5B, 6, 7A, 7B, 8, 9A, 9B, 10, 11, 12, 13, 14, 15, 16A, 16B, and 17 refer to elements having similar structure and/or function.

DETAILED DESCRIPTION OF THE INVENTION

Figure 1:
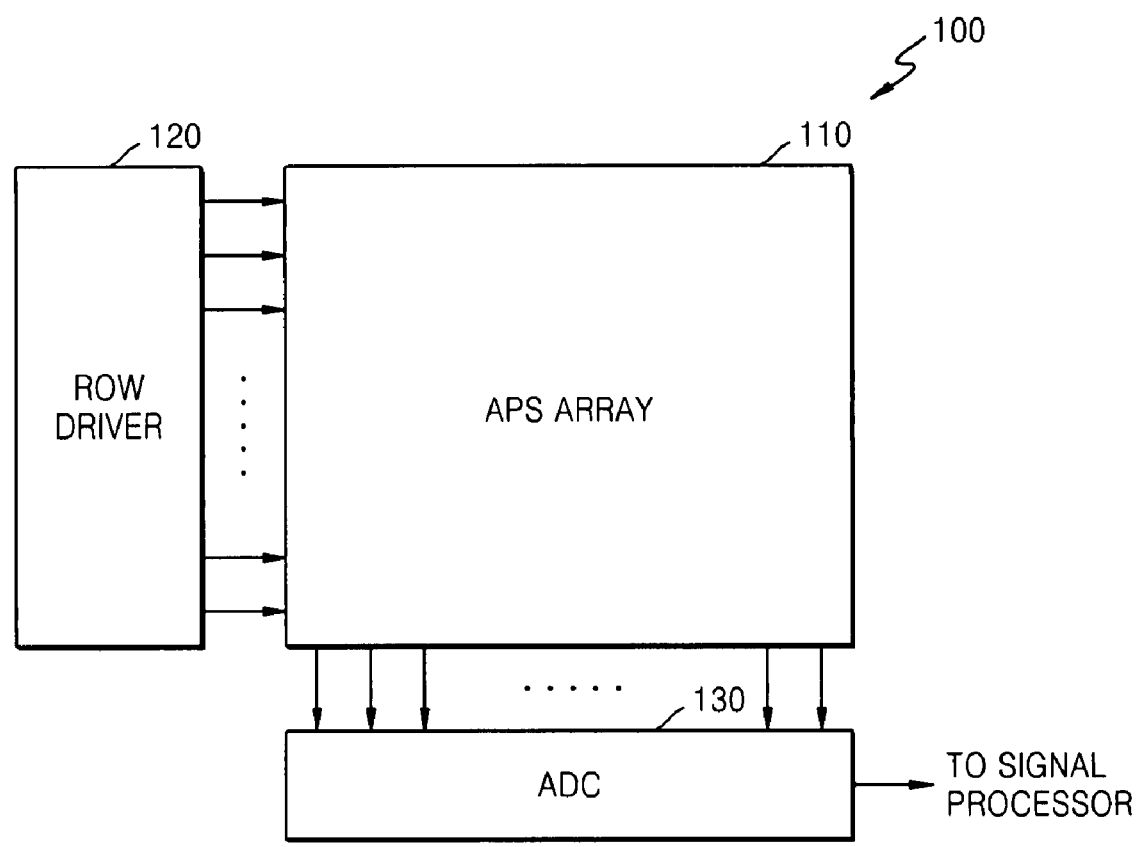
FIG. 1 is a block diagram of a conventional solid state image sensing device.
Figure 2:
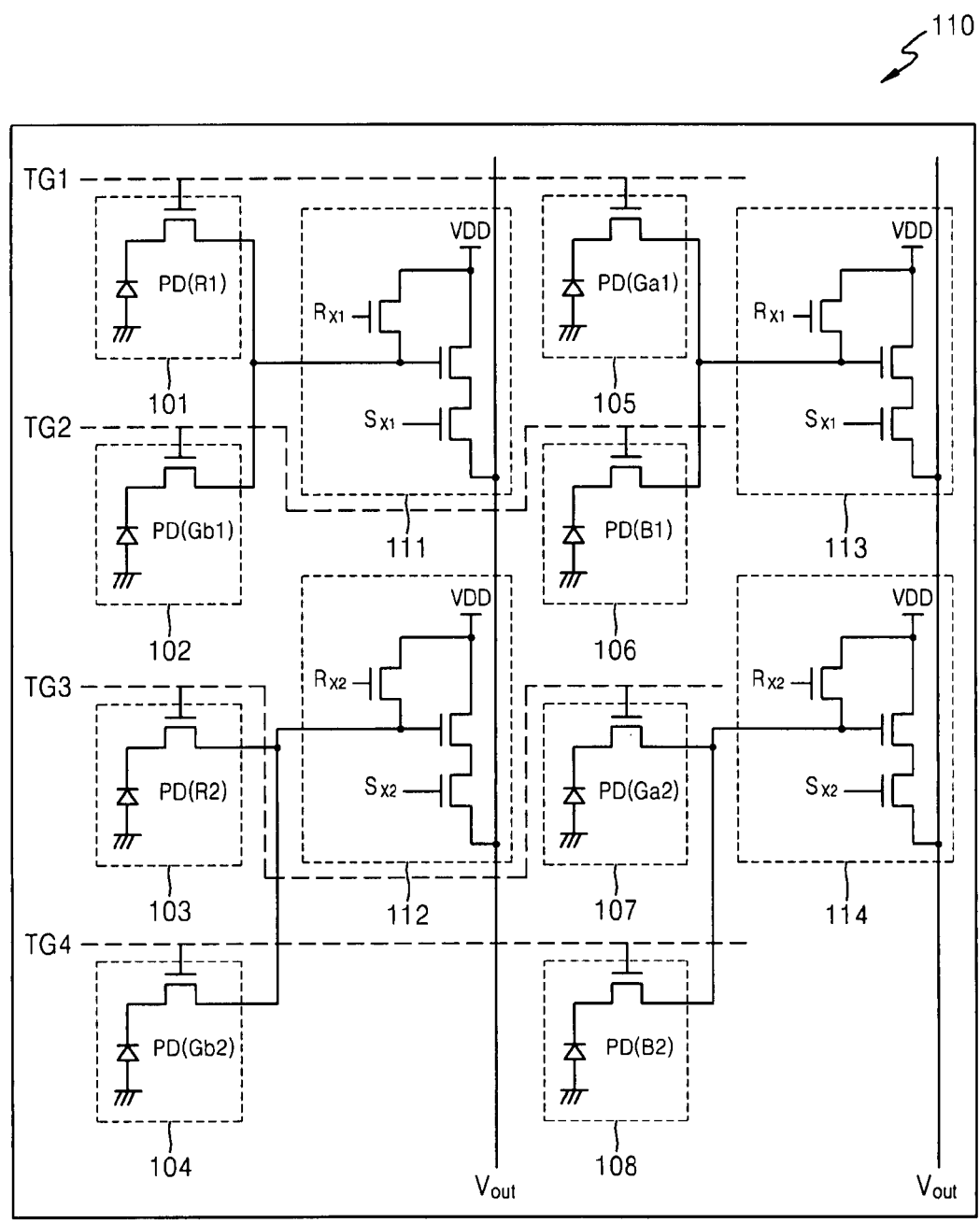
FIG. 2 is a circuit diagram of an example of an APS array in the image sensing device of FIG. 1, according to the prior art.
Figure 3:
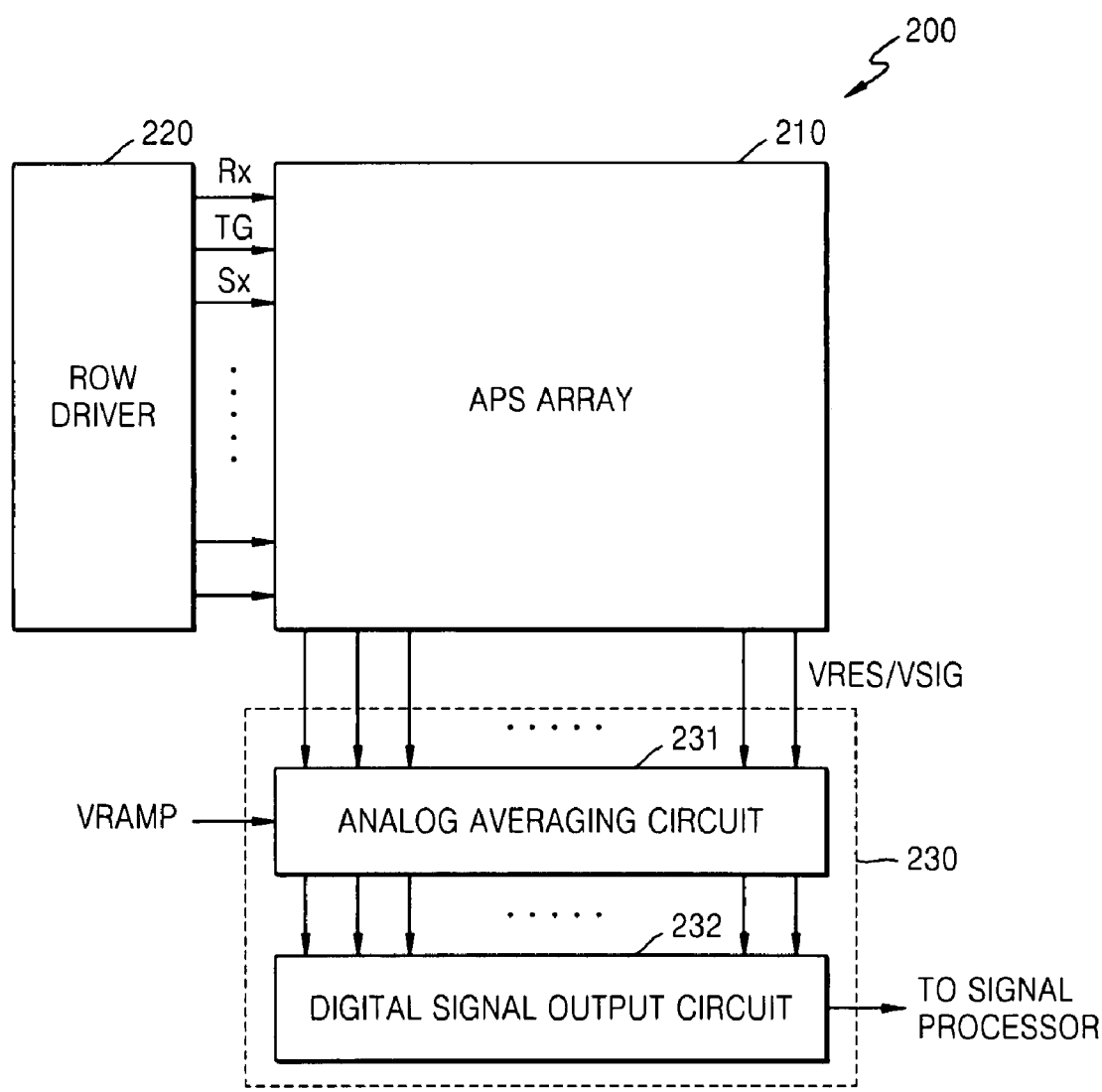
FIG. 3 is a block diagram of a solid state image sensing device according to an embodiment of the present invention.

FIG. 3 is a block diagram of a CIS (CMOS (complementary metal oxide semiconductor) image sensor) type solid-state image-sensing device 200 according to an embodiment of the present invention. The solid-state image-sensing device 200 includes an APS (active pixel sensor) array 210, a row driver 220, and an analog-to-digital conversion circuit/unit 230. The analog-to-digital conversion unit 230 includes an analog averaging unit 231 and a digital signal output circuit/unit 232.

The solid-state image-sensing device 200 outputs reset signals VRES and image signals VSIG as sensed by photodiodes of the APS array 210. The row driver 220 generates a transfer control signal TG, a reset control signal Rx, and a row select signal Sx for selecting a row of the APS array 210 to generate such signals. In an example embodiment of the present invention, the APS array 210 has a Bayer color pattern. In that case, three-color signals RGB are output from the solid-state image-sensing device 200 to be interpolated by a predetermined image signal processor (not shown) and then transmitted to a display device such as LCD to be displayed.

Figure 4:
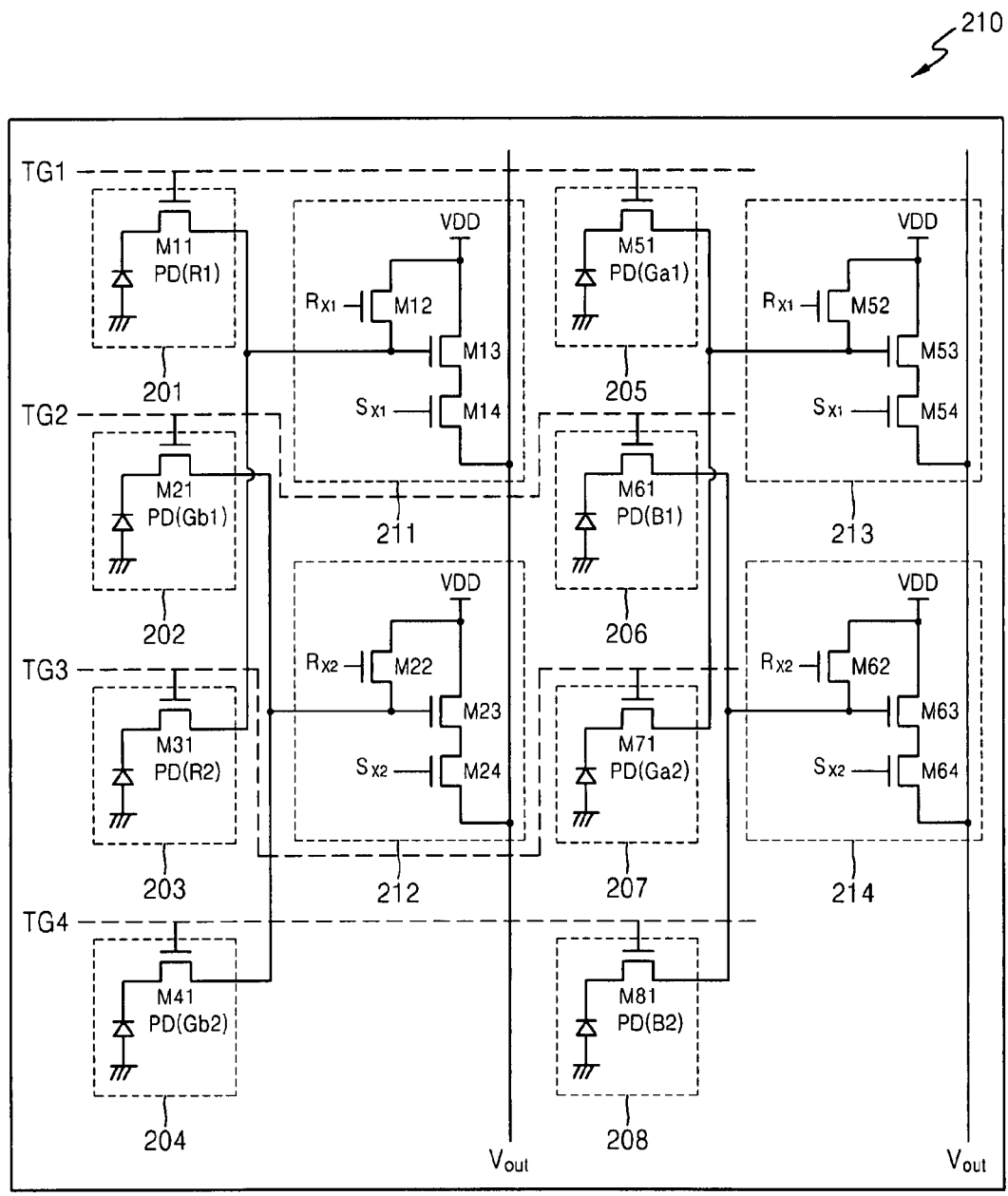
FIG. 4 is a circuit diagram of an example of an APS array in the image sensing device of FIG. 3, according to an embodiment of the present invention.

FIG. 4 is a partial circuit diagram of the APS array 210 of FIG. 3 according to an embodiment of the present invention. The APS array 210 includes a plurality of pixels 201, 202, 203, 204, 205, 206, 207, and 208, and a plurality of signal converters 211, 212, 213, and 214.

Each of the pixels 201, 202, 203, 204, 205, 206, 207, and 208 is arranged along rows and columns of a matrix of the pixels and converts a received light of a respective color into a corresponding photocurrent indicating the intensity of such received light. Each of the pixels 201, 202, 203, 204, 205, 206, 207, and 208 is comprised of a respective photodiode PD and a respective transfer MOSFET between the respective photodiode and one of the signal converters 211, 212, 213, and 214. Thus, the pixels 201, 202, 203, 204, 205, 206, 207, and 208 each include a photodiode PD(R1), PD(Gb1), PD(R2), PD(Gb2), PD(Ga1), PD(B1), PD(Ga2), and PD(B2), respectively, and each include a transfer MOSFET (metal oxide semiconductor field effect transistor) M11, M21, M31, M41, M51, M61, M71, and M81, respectively.

Each of the photodiodes PD is for receiving light of a respective color defined by a color filter disposed thereon. Photodiodes PD with a label R1 or R2 are for receiving red colored light, photodiodes PD with a label B1 or B2 are for receiving blue colored light, and photodiodes PD with a label Ga1, Ga2, Gb1, or Gb2 are for receiving green colored light. Each of the signal converters 211, 212, 213, and 214 converts photocurrent output from any of the pixels 201, 202, 203, 204, 205, 206, 207, and 208 coupled thereto into a respective output voltage Vout.

The APS array 210 has a shared FD (floating diffusion) pixel structure with each of the signal converters 211, 212, 213, and 214 being coupled to a set of two pixels for receiving light of a same color. Each signal converter receives and converts a respective photocurrent from such two pixels into an electrical signal.

When the APS array 210 has a Bayer color pattern, the pixels for receiving red light are disposed alternately with pixels for receiving green light in the first column, and the pixels for receiving blue light are disposed alternately with pixels for receiving green light in the second column. Thus, the signal converter 211 is coupled to the two non-adjoining pixels 201 and 203 for receiving red light, with the pixel 202 for receiving green light disposed between such two pixels 201 and 203 along the first column of pixels. The signal converter 212 is coupled to the two non-adjoining pixels 202 and 204 for receiving green light, with the pixel 203 for receiving red light disposed between such two pixels 202 and 204 along the first column of pixels.

Similarly, the signal converter 213 is coupled to the two pixels 205 and 207 for receiving green light with the pixel 206 for receiving blue light disposed between such two pixels 205 and 207 along the second column of pixels. The signal converter 214 is coupled to the two pixels 206 and 208 for receiving blue light, with the pixel 207 for receiving green light disposed between such two pixels 206 and 208 along the second column of pixels.

The signal converter 211 includes a reset MOSFET M12, a drive MOSFET M13, and a select MOSFET M14. Each of the other signal converters 212, 213, and 214 similarly includes a reset MOSFET, a drive MOSFET, and a select MOSFET. The reset MOSFET within each signal converter responds to a reset control signal Rx1 or Rx2 for resetting a pixel. The drive MOSFET within each signal converter has a gate coupled to the floating diffusion region for converting the photocurrent from a photodiode into a voltage. The select MOSFET is coupled to the drive MOSFET and responds to a select control signal Sx1 or Sx2 for selectively outputting the voltage output from the drive MOSFET to an external output line for generating a respective Vout.

The APS array 210 typically includes millions of pixels but the eight pixels 201, 202, 203, 204, 205, 206, 207, and 208 are shown in FIG. 4 for simplicity of illustration and description.

FIG. 5a is a signal timing diagram of control signals Rx1, Rx2, Sx1, Sx2, TG1, TG2, TG3, and TG4 when the APS array 210 of FIG. 4 captures an image of high resolution (for example, for capturing a still image) during a normal mode of operation. Referring to FIGS. 4 and 5a, the reset control signal Rx1 is coupled to the gates of the reset MOSFETs M12 and M52 for resetting the pixels 201 and 205 along a same row, and pixels 203 and 207 along another same row. Similarly, the reset control signal Rx2 is coupled to the gates of the reset MOSFETs M22 and M62 for resetting the pixels 202 and 206 along a same row, and 204 and 208 along another same row.

The select control signal Sx1 is coupled to the gates of the select MOSFETs M14 and M54 for transferring respective voltages generated by respective drive MOSFETs M13 and M53 as respective output voltages Vout along a same row of signal converters 211 and 213. Similarly, the select control signal Sx2 is coupled to the gates of the select MOSFETs M24 and M64 for transferring respective voltages generated by respective drive MOSFETs M23 and M63 as respective output voltages Vout along a same row of signal converters 212 and 214.

The transfer control signal TG1 is coupled to the gates of the transfer MOSFETs M11 and M51 for the first row of pixels 201 and 205. The transfer control signal TG2 is coupled to the gates of the transfer MOSFETs M21 and M61 for the second row of pixels 202 and 206. The transfer control signal TG3 is coupled to the gates of the transfer MOSFETs M31 and M71 for the third row of pixels 203 and 207. The transfer control signal TG4 is coupled to the gates of the transfer MOSFETs M41 and M81 for the fourth row of pixels 204 and 208.

The solid-state image-sensing device 200 of FIG. 3 uses a correlated double sampling (CDS) method for capturing images of high quality. Such a CDS method removes noise by measuring a reset voltage in a reset state and an image signal voltage generated from the photocurrent of a photodiode for determining a difference between such an image signal voltage and such a the reset voltage. Such a CDS method generally and individually is known to one of ordinary skill in the art of image sensors.

Referring to FIGS. 4 and 5a, when the solid-state image-sensing device 200 captures a still image, the photocurrents from the pixels along each column of pixels are sequentially and separately measured. Such sequential and separate measurement for the first column of pixels 201, 202, 203, and 204 is now described.

Referring to FIGS. 4 and 5a, the reset control signals Rx1 and Rx2 are initially set to logic high while the transfer control signals TG1, TG2, TG3, and TG4 are logic low for resetting the pixels. Thereafter, after the reset control signal Rx1 is logic low and the select control signal Sx1 is logic high, the reset voltage for the first pixel 201 is output as Vout (left-most arrow in FIG. 5a).

Thereafter, when the transfer control signal TG1 is logic high as a pulse signal to turn on the transfer MOSFET M11 of the pixel 201, a photocurrent from the photodiode PD(R1) of the pixel 201 is transferred to the floating diffusion region (i.e., the gate of the drive MOSFET M13). Subsequently, an image signal voltage corresponding to such photocurrent is output as Vout (second arrow from the left in FIG. 5a). In the CDS method, the difference between the image signal voltage and the reset voltage for the first pixel 201 is used for indicating the intensity of red light received by the pixel 201.

Subsequently, the reset control signals Rx1 and Rx2 are logic high while the transfer control signals TG1, TG2, TG3, and TG4 are logic low for resetting the pixels. The control signals Rx1, Rx2, Sx1, Sx2, and TG2 are controlled similarly for the pixel 202 to generate the corresponding reset voltage and the corresponding image signal voltage as Vout (third and fourth arrows from the left in FIG. 5a).

In addition, the control signals Rx1, Rx2, Sx1, Sx2, and TG3 are controlled similarly for the pixel 203 to generate the corresponding reset voltage and the corresponding image signal voltage as Vout (fifth and sixth arrows from the left in FIG. 5a). Furthermore, the control signals Rx1, Rx2, Sx1, Sx2, and TG4 are controlled similarly for the pixel 204 to generate the corresponding reset voltage and the image signal voltage as Vout (seventh and eight arrows from the left in FIG. 5a).

In this manner, voltages from each of the pixels 201, 202, 203, and 204 along the first column are generated as Vout separately and sequentially for capturing a still image. Thus, the select MOSFETs M14 and M24 within the signal converters 211 and 212 are turned on alternately.

Similarly, the voltages from each of the pixels 205, 206, 207, and 208 along the second column are generated as Vout separately and sequentially for capturing the still image. Thus, the select MOSFETs M54 and M64 within the signal converters 213 and 214 are turned on alternately.

FIG. 5b is a signal timing diagram of control signals Rx1, Rx2, Sx1, Sx2, TG1, TG2, TG3, and TG4 when the APS array 210 of FIG. 4 captures an image of low resolution (for example, a moving image) during a sub-sampling mode of operation. However, such a sub-sampling mode of operation may be used for capturing a still image and/or a moving image.

Initially, the reset control signals Rx1 and Rx2 are initially set to logic high while the transfer control signals TG1, TG2, TG3, and TG4 are logic low for resetting the pixels. Thereafter, after the reset control signal Rx1 is logic low and the select control signal Sx1 is logic high, the reset voltage for the non-adjoining pixels 201 and 203 is output as Vout (left-most arrows in FIG. 5b).

Subsequently, transfer control signals TG1 and TG3 applied on the transfer MOSFETs M11 and M31 are simultaneously activated to logic high as pulse signals. Thus, the photocurrents from the two non-adjoining pixels 201 and 203 for receiving red light are transferred to the floating diffusion area (i.e., the gate of M13). Such photocurrents are summed at the gate of M13 to generate a corresponding image signal voltage as Vout for the two non-adjoining pixels 201 and 203 (second arrows from the left in FIG. 5b).

In addition, the control signals Rx1, Rx2, Sx1, Sx2, TG2 and TG4 are controlled similarly for the non-adjoining pixels 202 and 204. Thus, the reset voltage for the pixels 202 and 204 are generated as Vout when the reset control signal Rx2 is logic low and the select control signal Sx2 is logic high for the signal converter 212 (third arrows from the left in FIG. 5b). In addition, the image signal voltage that includes a sum of the photocurrents from the pixels 202 and 204 for receiving green light is generated as Vout after both transfer control signals TG2 and TG4 are activated to logic high (fourth arrows from the left in FIG. 5b).

The signal converters 213 and 214 for the second column of pixels 205, 206, 207, and 208 operate similarly. Thus, the signal converter 213 generates an image signal voltage as Vout for the non-adjoining pixels 205 and 207 from a sum of the photocurrents from such pixels 205 and 207 for receiving green light, and the signal converter 214 subsequently generates an image signal voltage Vout for the non-adjoining pixels 206 and 208 from a sum of the photocurrents from such pixels 206 and 208 for receiving blue light.

In this manner, photocurrents from multiple pixels are added before the image signal voltage is generated as Vout for capturing a moving image in the solid-state image-sensing device 200. Thus, the solid-state image-sensing device 200 has lower operating frequency and power consumption than the conventional image sensor that reads all pixels with averaging through image signal processing (ISP).

In addition, because photocurrents from all pixels are processed, moving images of high quality are captured. Furthermore, with the shared FD pixel structure, the area of the solid-state image-sensing device 200 is reduced.

Figure 6:
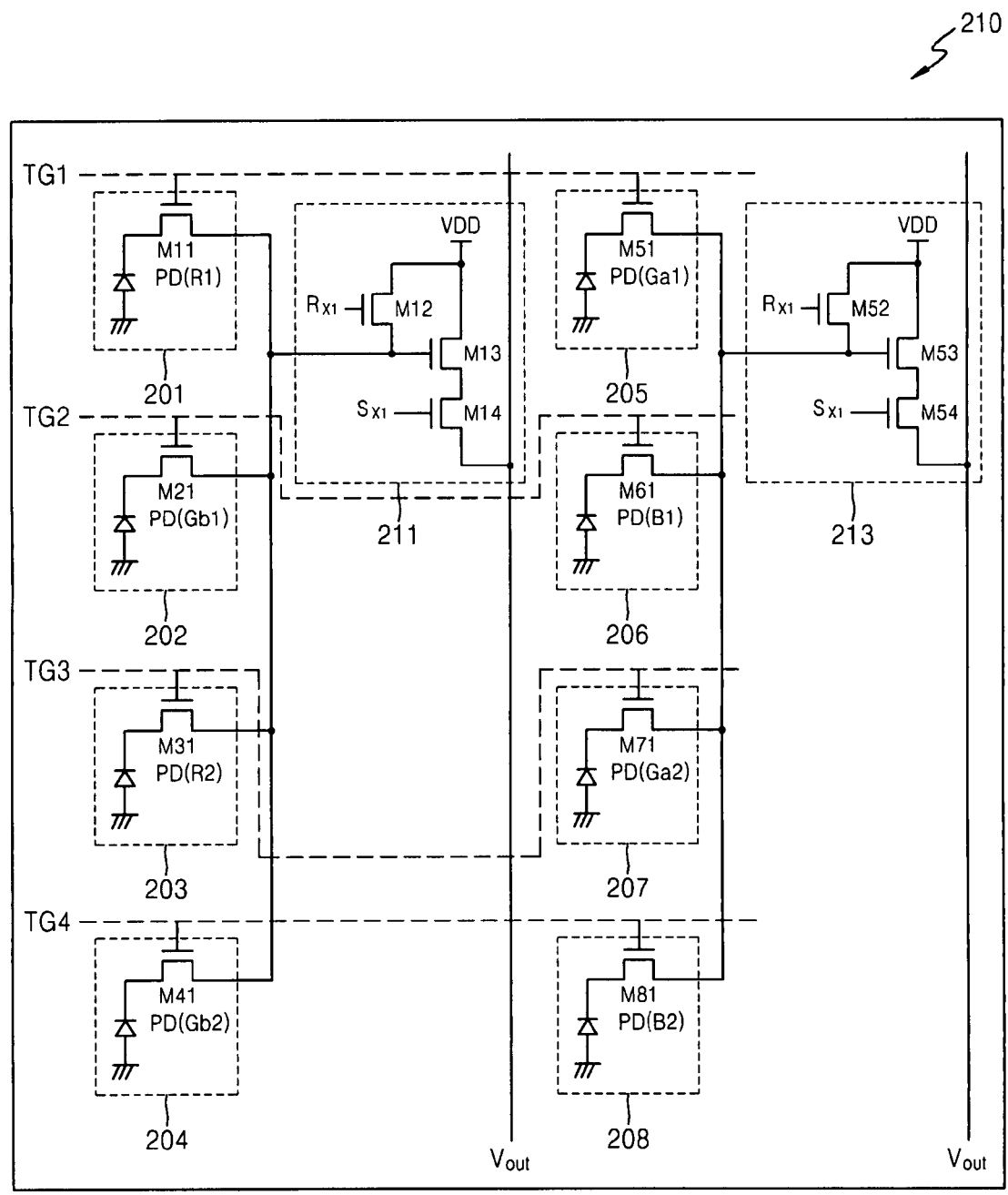
FIG. 6 is a circuit diagram of another example of the APS array of FIG. 3, according to another embodiment of the present invention.

FIG. 6 is a partial circuit diagram of the APS array 210 of FIG. 3 according to another embodiment of the present invention. The APS array 210 typically has millions of pixels arranged in a matrix of rows and columns, but eight pixels 201, 202, 203, 204, 205, 206, 207, and 208 are shown in FIG. 6 for simplicity of illustration and description.

Referring to FIG. 6, the APS array 210 includes the plurality of pixels 201, 202, 203, 204, 205, 206, 207, and 208 and signal converters 211 and 213. However, in the APS array 210 of FIG. 6, the signal converter 211 is coupled to a first set of non-adjoining pixels 201 and 203 for receiving red light and to a second set of non-adjoining pixels 202 and 204 for receiving green light. Pixels of the first set are disposed alternately with pixels of the second set in the Bayer color pattern for the first column of pixels 201, 202, 203, and 204.

Similarly, the signal converter 213 is coupled to a first set of non-adjoining pixels 205 and 207 for receiving green light and to a second set of non-adjoining pixels 206 and 208 for receiving blue light. Pixels of the first set are disposed alternately with pixels of the second set in the Bayer color pattern for the second column of pixels 205, 206, 207, and 208.

FIG. 7a is a signal timing diagram of control signals Rx1, Rx2, Sx1, Sx2, TG1, TG2, TG3, and TG4 when the APS array 210 of FIG. 6 captures an image of high resolution (for example, a still image) during a normal mode of operation.

Referring to FIG. 7a, when the APS array 210 captures a still image, the photocurrents from the pixels along each column of pixels are separately and sequentially measured. Such separate and sequential measurement for the first column of pixels 201, 202, 203, and 204 is now described.

Referring to FIGS. 6 and 7a, the reset control signal Rx1 is initially set to logic high while the transfer control signals TG1, TG2, TG3, and TG4 are logic low for resetting the pixels. Thereafter, after the reset control signal Rx1 is logic low and the select control signal Sx1 is logic high, the reset voltage for the first pixel 201 is output as Vout (left-most arrow in FIG. 7a).

Thereafter, when transfer control signal TG1 is logic high as a pulse signal to turn on the transfer MOSFET M11 of the pixel 201, a photocurrent from the photodiode PD(R1) of the pixel 201 is transferred to the floating diffusion region (i.e., the gate of the drive MOSFET M13). Subsequently, an image signal voltage corresponding to such photocurrent is output as Vout (second arrow from the left in FIG. 7a). In the CDS method, the difference between the image signal voltage and the reset voltage for the first pixel 201 is used for indicating the intensity of red light received by the pixel 201.

Subsequently, the reset control signal Rx1 is logic high while the transfer control signals TG1, TG2, TG3, and TG4 are logic low for resetting the pixels, and thereafter the reset voltage for the pixel 202 is output as Vout (third arrow from the left in FIG. 7a). The transfer control signal TG2 is then activated to logic high for generating an image signal voltage of the pixel 202 as Vout (fourth arrow from the left in FIG. 7a).

In addition, the control signals Rx1, Sx1, and TG3 are controlled similarly for the pixel 203 for generating the corresponding reset voltage and the corresponding image signal voltage (fifth and sixth arrows from the left in FIG. 7a). Furthermore, the control signals Rx1, Sx1, and TG4 are controlled similarly for the pixel 204 for generating the corresponding reset voltage and the corresponding image signal voltage (seventh and eight arrows from the left in FIG. 7a).

In this manner, the respective photocurrent from each of the pixels 201, 202, 203, and 204 is used to generate the respective image data signal as Vout separately and sequentially via the signal converter 211 for capturing the still image. Similarly, the respective photocurrent from each of the pixels 205, 206, 207, and 208 from the second column is used to generate the respective image data signal as Vout separately and sequentially via the signal converter 213 for capturing the still image.

Figure 7B:
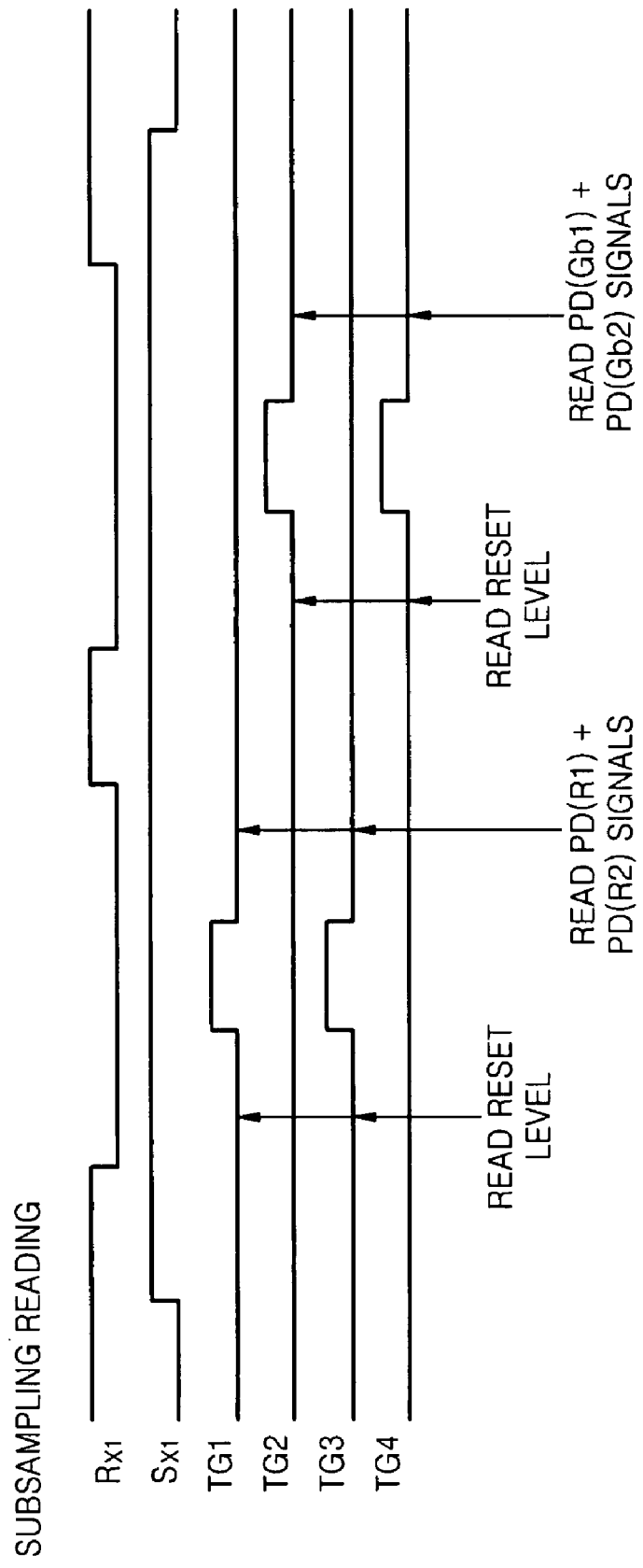

FIG. 7b is a signal timing diagram of control signals Rx1, Sx1, TG1, TG2, TG3, and TG4 when the APS array 210 of FIG. 6 captures an image of low resolution (for example, a moving image) during a sub-sampling mode of operation. However, such a sub-sampling mode of operation may be used for capturing a still image and/or a moving image.

Initially, the reset control signal Rx1 is set to logic high while the transfer control signals TG1, TG2, TG3, and TG4 are logic low for resetting the pixels. Thereafter, after the reset control signal Rx1 is logic low and the select control signal Sx1 is logic high, the reset voltage for the non-adjoining pixels 201 and 203 is output as Vout (left-most arrows in FIG. 7b).

Subsequently, transfer control signals TG1 and TG3 applied on the transfer MOSFETs M11 and M31 are simultaneously activated to logic high as pulse signals. Thus, the photocurrents from the two non-adjoining pixels 201 and 203 for receiving red light are transferred to the floating diffusion area (i.e., the gate of M13). Such photocurrents are summed at the gate of M13 to generate a corresponding image signal voltage as Vout (second arrows from the left in FIG. 7b).

Thereafter, the reset control signal Rx1 is activated to logic high while the transfer control signals TG1, TG2, TG3, and TG4 are logic low for resetting the pixels again. Subsequently, after the reset control signal Rx1 is logic low and the select control signal Sx1 is logic high, the reset voltage for the non-adjoining pixels 202 and 204 is output as Vout (third arrows from left in FIG. 7b).

Thereafter, transfer control signals TG2 and TG4 applied on the transfer MOSFETs M21 and M41 are simultaneously activated to logic high as pulse signals. Thus, the photocurrents from the two non-adjoining pixels 202 and 204 for receiving green light are transferred to the floating diffusion area (i.e., the gate of M13). Such photocurrents are summed at the gate of M13 to generate a corresponding image signal voltage as Vout (fourth arrows from the left in FIG. 7b).

In this manner, photocurrents from multiple pixels are added before the image signal voltage is generated as Vout for capturing a moving image in the APS array 210. Thus, the solid-state image-sensing device 200 has lower operating frequency and power consumption than the conventional image sensor that reads all pixels with averaging through image signal processing (ISP).

In addition, because photocurrents from all pixels are processed, moving images of high quality are captured. Furthermore, with the shared FD pixel structure, the area of the solid-state image-sensing device 200 is reduced.

Figure 8:
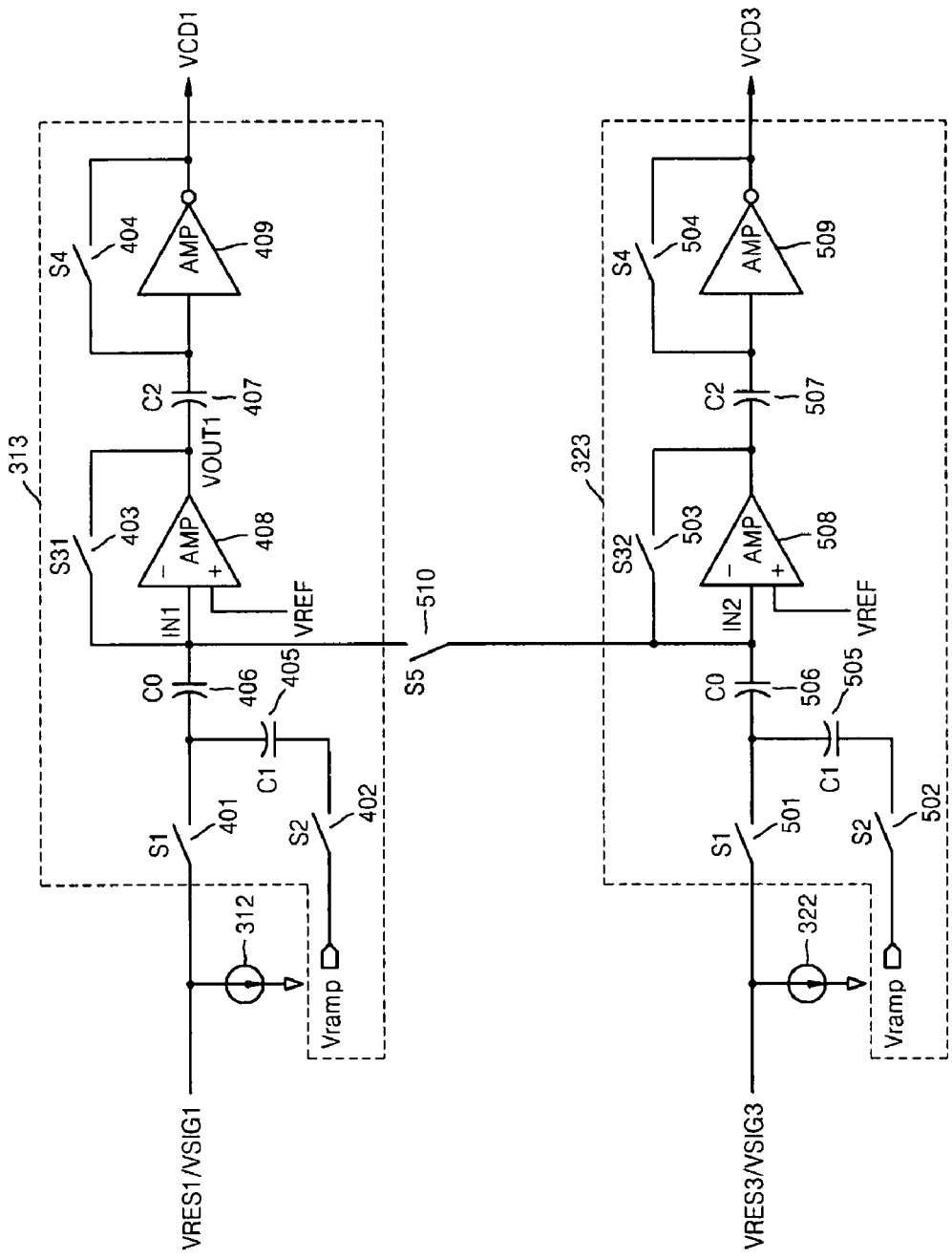
FIG. 8 is a circuit diagram of an analog averaging unit of FIG. 3, according to an embodiment of the present invention.

FIG. 8 is a circuit diagram of the analog averaging unit of FIG. 3, according to an example embodiment of the present invention. The analog averaging unit 231 includes a respective correlated double sampling (CDS) unit 313 or 323 for each column of the APS array 210. For example in FIG. 8, the analog averaging unit 231 includes a first CDS unit 313 for a first column of the APS array 210, and a second CDS unit 323 for a third column of the APS array 210. In an example embodiment of the present invention, such first and third columns of the APS array 210 output signals simultaneously representing same colors.

Although not shown in the drawings, a respective CDS unit is formed for each column of the APS array 210 within the analog averaging unit 231. The first CDS unit 313 processes a first reset signal VRES1 and a first image signal VSIG1 generated on a first output line from the first column, and the second CDS circuit 323 processes a second reset signal VRES3 and a second image signal VSIG3 generated on a second output line from the third column.

Meanwhile, each of predetermined current sources 312 and 322 are formed for a respective one of the output lines corresponding to the first and third columns of the APS array 210. In addition, a mode switch 510 is disposed between the CDS units 313 and 323. In particular, a respective mode switch is disposed between the CDS units of each pair of odd-numbered columns, and a respective mode switch is disposed between the CDS units of each pair of even-numbered columns.

The first CDS unit 313 includes a first set of control switches 401, 402, 403 and 404, a first set of capacitors 405, 406 and 407, and a first set of amplifiers 408 and 409, all configured as illustrated in FIG. 8. The switches 401, 402, 403, and 404 are controlled by switch control signals S1, S2, S31, and S4, respectively.

The second CDS unit 323 includes a second set of control switches 501, 502, 503 and 504, a second set of capacitors 505, 506 and 507, and a second set of amplifiers 508 and 509, all configured as illustrated in FIG. 8. The switches 501, 502, 503, and 504 are controlled by switch control signals S1, S2, S32, and S4, respectively. The capacitors 405 and 505 each have a capacitance of about C1; the capacitors 406 and 506 each have a capacitance of about C0; and the capacitors 407 and 507 each have a capacitance of about C2.

The operation of the first and second CDS units 313 and 323 during the normal mode for capturing a still image is now explained. The first CDS unit 313 sequentially receives the first reset signal VRES1 and the first image signal VSIG1 to generate a signal corresponding to a difference between such signals VRES1 and VSIG1 as an amplifier input signal VIN1 for the amplifier 408. In addition, the first CDS unit 313 compares the amplifier input signal VIN1 with a reference voltage VREF to generate a respective pulse width signal VCD1 having a respective pulse width determined by the comparison result.

The second CDS unit 323 sequentially receives the second reset signal VRES3 and the second image signal VSIG3 and generates a signal corresponding to a difference between such signals VRES3 and VSIG3 as an amplifier input signal VIN2 for the amplifier 508. In addition, the second CDS unit 323 compares the amplifier input signal VIN2 with the reference voltage VREF to generate a respective pulse width signal VCD3 having a respective pulse width determined by the comparison result.

The mode switch 510 is connected between the inputs of the amplifiers 408 and 508 receiving the amplifier input signals VIN1 and VIN2, respectively. In the normal mode of operation for capturing a still image, the mode switch 510 is opened such that the respective pulse width signals VCD1 and VCD2 are separate and independent from each-other. The mode switch 510 is controlled by a switch control signal S5.

Figure 9A:
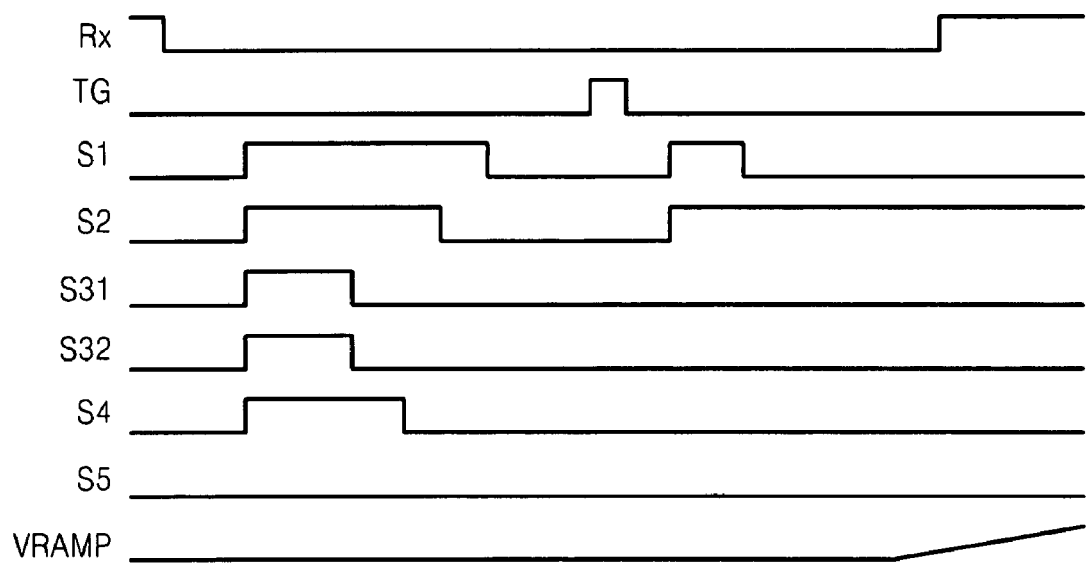
FIGS. 9A and 9B are timing diagrams of control signals for driving the analog averaging unit of FIG. 8 for normal and sub-sampling modes of operation, respectively, according to an embodiment of the present invention.
Figure 9B:
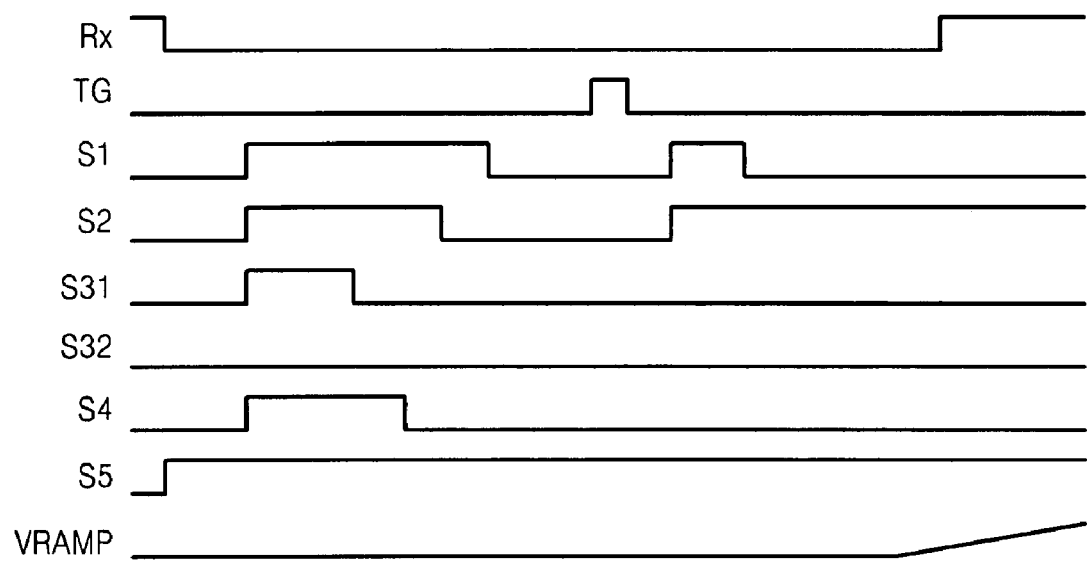

Referring to FIGS. 8, 9A, and 9B, when any of the switch control signals S1, S2, S31, S32, S4, and S5 is at logic low, the respective switch 401, 501, 402, 502, 403, 503, 404, 504, or 510 is opened. Alternatively, when any of the switch control signals S1, S2, S31, S32, S4, and S5 is at logic high, the respective switch 401, 501, 402, 502, 403, 503, 404, 504, or 510 is closed.

FIG. 9A shows a timing diagram of control signals during operation of the analog averaging unit 231 of FIG. 8 during the normal mode, according to an embodiment of the present invention. FIG. 9B shows a timing diagram of control signals during operation of the analog averaging unit 231 of FIG. 8 during the sub-sampling mode, according to an embodiment of the present invention.

Figure 10:
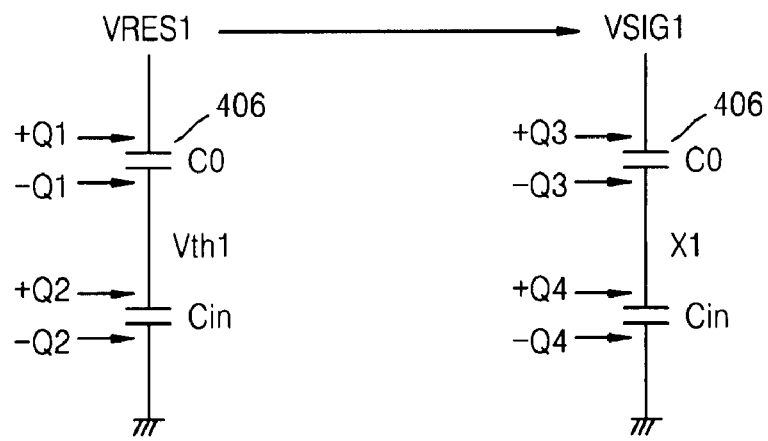
FIGS. 10 and 11 are circuit diagrams illustrating capacitor characteristics of the analog averaging unit of FIG. 8, according to an embodiment of the present invention.
Figure 11:
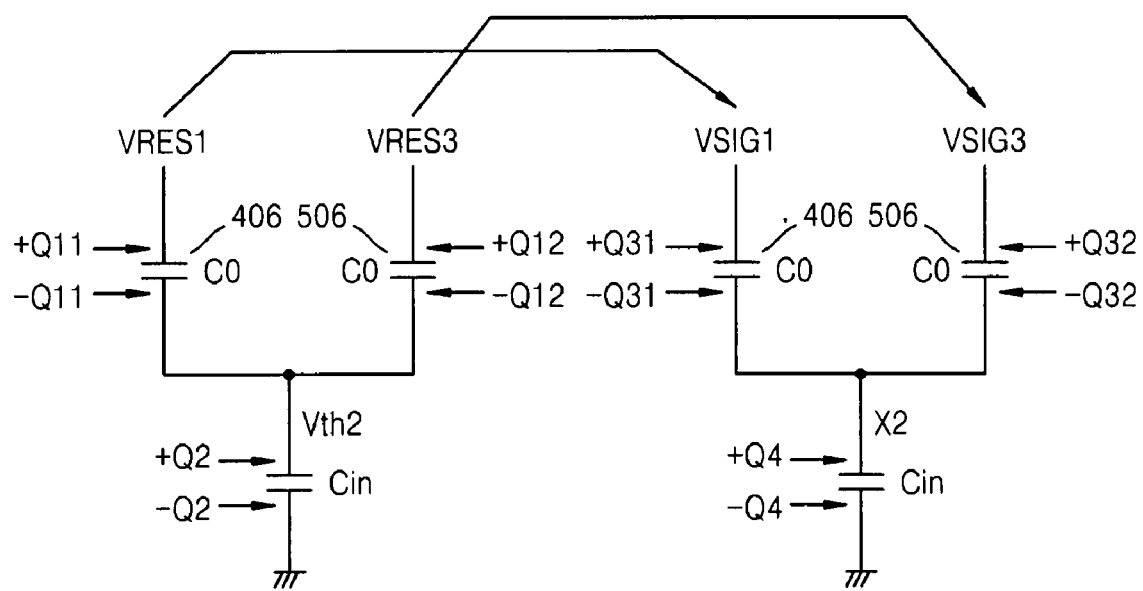

FIG. 10 illustrates a capacitor model of the analog averaging unit 231 of FIG. 8 when the first reset signal VRES1 is input (left side) and then the first image signal VSIG1 is input (left side) during the normal mode of operation. FIG. 11 illustrates a capacitor model of the analog averaging unit 231 of FIG. 8 when the reset signals VRES1 and VRES3 are input (left side) and then the image signals VSIG1 and VSIG3 are input (right side) during the sub-sampling mode of operation.

Referring to FIG. 9A for the normal mode of operation, the mode switch 510 is opened. Also in FIG. 9A, when the first, second, third and fourth switches 401, 402, 403 and 404 are closed, the first reset signal VRES1 is input to the first CDS unit 313. Referring to FIGS. 9A and 10, a voltage Vth1 is generated at an input node IN1 of the amplifier 408. When the first image signal VSIG1 is input to the first CDS circuit 313 in response to the transfer control signal TG, a voltage X1 is generated at the input node IN1 of the amplifier 408.

Referring to FIGS. 9A and 10, the following Equations 1, 2, 3, 4, 5, and 6 hold during the normal mode of operation of the analog averaging unit 231 of FIG. 8:

$$Q2-Q1=Q4-Q3 \quad \text{[Equation 1]}$$

$$X1=Q4/Cin \quad \text{[Equation 2]}$$

$$Q1=(VRES1-Vth1)*C0 \quad \text{[Equation 3]}$$

$$Q2=Vth1*Cin \quad \text{[Equation 4]}$$

$$Q3=(VSIG1-X)*C0 \quad \text{[Equation 5]}$$

$$X1=Vth1-(VRES1-VSIG1)*\{C0/(C0+Cin)\} \quad \text{[Equation 6]}$$

Above, C0 denotes the capacitance of the capacitor 406, and Cin represents a capacitance at the input node IN1 of the amplifier 408. Q1 represent a charge quantity across the capacitor 406 when the first reset signal VRES1 is input. Q3 represent a charge quantity across the capacitor 406 when the first image signal VSIG1 is input after the first reset signal VRES1 is input.

Q2 represents a charge quantity at the input node IN1 of the amplifier 408 when the first reset signal VRES1 is input. Q4 denotes a charge quantity at the input node IN1 of the amplifier 408 when the first image signal VSIG1 is input after the first reset signal VRES1 is input. When C0 is significantly larger than Cin in Equation 6, Equation 6 approximates to Equation 7 below:

$$X1=Vth1-(VRES1-VSIG1) \quad \text{[Equation 7]}$$

Referring to FIG. 9A, when a ramp signal VRAMP is gradually increased, the signal at the node IN1 corresponding to the difference between the signals VRES1 and VSIG1 is also increased in response to the ramp signal VRAMP. The amplifier 408 compares such an increasing signal with the reference voltage VREF and outputs a signal VOUT1 with a respective pulse width determined by the comparison result.

The amplifier 409 receives and buffers such a signal VOUT1 through the capacitor 407 to generate the respective pulse width signal VCD1 having a respective pulse width that indicates a difference between the first reset and image signals VRES1 and VSIG1. In the same manner, the second CDS unit 323 receives the second reset signal VRES3 and the second image signal VSIG3 and generates the respective pulse width signal VCD3 having a respective pulse width that indicates a difference between such signals VRES2 and VSIG2.

Referring to FIG. 9B for the sub-sampling mode of operation, the mode switch 510 is closed, and the switch 503 is opened. Thus, in the sub-sampling mode, the second set of amplifiers 508 and 509 in the second CDS unit 323 are not operated. In that case, the output of the second CDS unit 323 is not used, and just the respective pulse width signal VCD1 of the first CDS unit 313 is used. In addition in that case, the input nodes IN1 and IN2 of the amplifiers 408 and 508 of the first and second CDS units 313 and 323 are short-circuited together.

Referring to FIGS. 8, 9B, and 11, when the switches 401 and 501 of the first and second CDS unit 313 and 323 are closed, a signal corresponding to an average (Vth2 in FIG. 11) of the first and second reset signals VRES1 and VRES3 is generated at the input nodes IN1 and IN2 of the amplifiers 408 and 508. Subsequently, when the first and second image signals VSIG1 and VSIG3 are respectively input to the first and second CDS units 313 and 323 in response to the transfer control signal TG, a voltage X2 in FIG. 11 is generated at the input node IN1 of the amplifier 408 of the first CDS unit 313.

Referring to FIG. 11, the following Equations 8, 9, 10, 11, 12, 13, 14, and 15 hold in such a sub-sampling mode:

$$Q2-(Q11-Q12)=Q4-(Q31+Q32) \quad \text{[Equation 8]}$$

$$Q11=(VRES1-Vth2)*C0 \quad \text{[Equation 9]}$$

$$Q12=(VRES3-Vth2)*C0 \quad \text{[Equation 10]}$$

$$Q2=Vth2*Cin \quad \text{[Equation 11]}$$

$$Q31=(VSIG1-X2)*C0 \quad \text{[Equation 12]}$$

$$Q32=(VSIG3-X2)*C0 \quad \text{[Equation 13]}$$

$$X2=Q4/Cin \quad \text{[Equation 14]}$$

$$X2=Vth2-\{(VRES1-VSIG1)+(VRES3-VSIG3)*\{C0/(2*C0+Cin)\} \quad \text{[Equation 15]}$$

Above, C0 denotes the capacitance of each of the capacitors 405, 406, 505 and 506, and Cin represents the capacitance at each of the input nodes IN1 and IN2 of the amplifiers 408 and 508. Q11 represents a charge quantity across the capacitor 406 when the first and second reset signals VRES1 and VRES3 are input. Q31 represents a charge quantity across the capacitor 406 when the first and second image signals VSIG1 and VSIG3 are input after the first and second reset signals VRES1 and VRES3 are input.

In addition, Q12 represents a charge quantity across the capacitor 506 when the first and second reset signals VRES1 and VRES3 are input. Q32 represents a charge quantity across the capacitor 506 when the first and second image signals VSIG1 and VSIG3 are input after the first and second reset signals VRES1 and VRES3 are input. Q2 represents a charge quantity at the input node IN1 of the amplifier 408 when the first and second reset signals VRES1 and VRES3 are input.

Q4 represents a charge quantity at the input node IN1 of the amplifier 408 when the first and second image signals VSIG1 and VSIG3 are input after the first and second reset signals VRES1 and VRES3 are input. When C0 is significantly larger than Cin, Equation 15 approximates to Equation 16 below:

$$X2 = Vth2 - \{(VRES1 - VSIG1) + (VRES3 - VSIG3)\}/2 \quad \text{[Equation 16]}$$

In this manner, the signal X2 indicates an average of a first difference (VRES1−VSIG1) between the first reset signal VRES1 and the first image signal VSIG1 and a second difference (VRES3−VSIG3) between the second reset signal VRES3 and the second image signal VSIG3. The first amplifier 408 of the first CDS circuit 313 modulates such a signal X2 at the input node IN1 into the respective pulse width signal VCD1.

Figure 12:
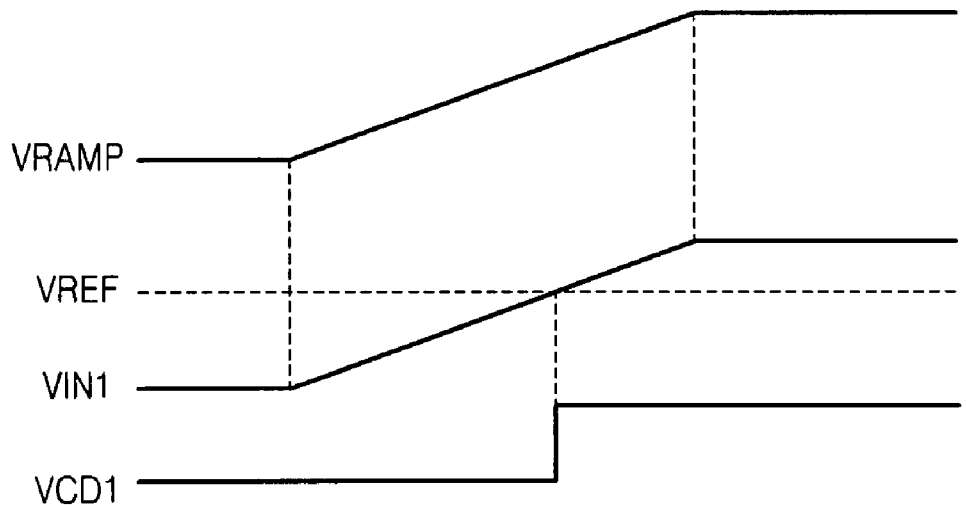
FIG. 12 is a timing diagram of signals during operation of the analog averaging unit of FIG. 8, according to an embodiment of the present invention.

As the signal X2 is generated, the ramp signal VRAMP is gradually increased as shown in FIG. 9B. As a result, the first amplifier 408 compares the signal VIN1 at the input node IN1, which is increased in response to the ramp signal VRAMP, with the reference voltage VREF to output the signal VOUT1 having a respective pulse width, as illustrated in FIG. 12.

The amplifier 409 receives and buffers the signal VOUT1 through the capacitor 407 to generate the respective pulse width signal VCD1 having a respective pulse width proportional to the magnitude of the signal X2 which indicates the average of a first difference (VRES1−VSIG1) between the first reset signal VRES1 and the first image signal VSIG1 and a second difference (VRES3−VSIG3) between the second reset signal VRES3 and the second image signal VSIG3.

During such a sub-sampling mode of FIG. 9B, the amplifiers 508 and 509 of the second CDS unit 323 are not operated. Alternatively, the switch 503 in the second CDS unit 323 may be closed, and the switch 403 in the first CDS unit 313 may be opened. In that case, the first and second amplifiers 408 and 409 of the first CDS unit 313 are not operated, and the second CDS unit 323 is used instead to generate the respective pulse width signal VCD3 indicating the average of a first difference (VRES1−VSIG1) between the first reset signal VRES1 and the first image signal VSIG1 and a second difference (VRES3−VSIG3) between the second reset signal VRES3 and the second image signal VSIG3.

Alternatively during the sub-sampling mode, both of the switches 403 and 503 of the first and second CDS units 313 and 323 are short-circuited. In that case, the first and second CDS unit 313 and 323 both operate to generate the respective pulse width signals VCD1 and VCD3 each having a same value that indicates the average of a first difference (VRES1−VSIG1) between the first reset signal VRES1 and the first image signal VSIG1 and a second difference (VRES3−VSIG3) between the second reset signal VRES3 and the second image signal VSIG3. Thus, one of the pulse width signals VCD1 and VCD3 may be chosen.

In addition, although the example of FIGS. 8 and 9B illustrates averaging of image signals of two columns of the APS array 210, image signals from three or more columns of the APS array 210 may be averaged. In that case, input nodes of the amplifiers of the three or more CDS units would be short-circuited, and one of the respective pulse width signals generated from the respective three or more CDS units would be chosen for indicating the average.

Figure 13:
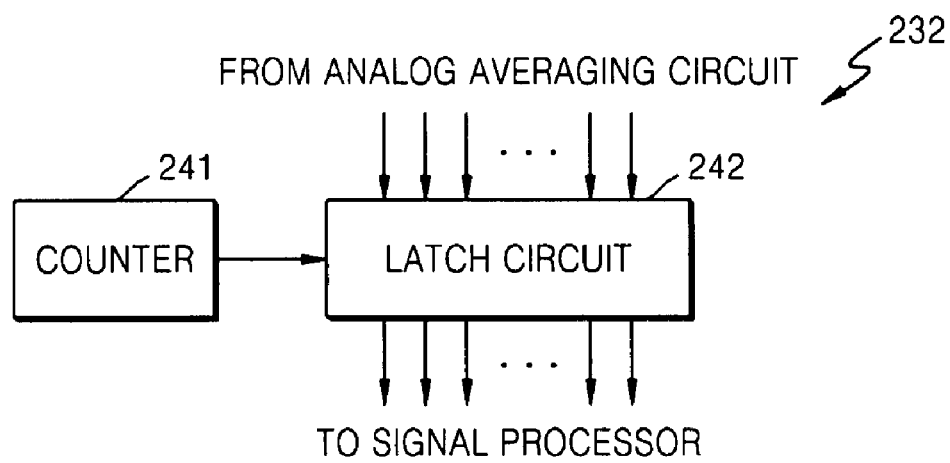
FIG. 13 is a block diagram of a digital signal output unit of FIG. 3, according to an embodiment of the present invention.

FIG. 13 is a block diagram of the digital signal output unit 232 of FIG. 3. Referring to FIG. 13, the digital signal output unit 232 includes a counter 241 and a latch circuit 242. The counter 241 starts counting from when the ramp signal VRAMP begins to increase to generate a count value corresponding to a time point of a logical transition in the pulse width signal VCD1. The latch circuit 242 stores and outputs such a count value received from the counter 241.

Figure 14:
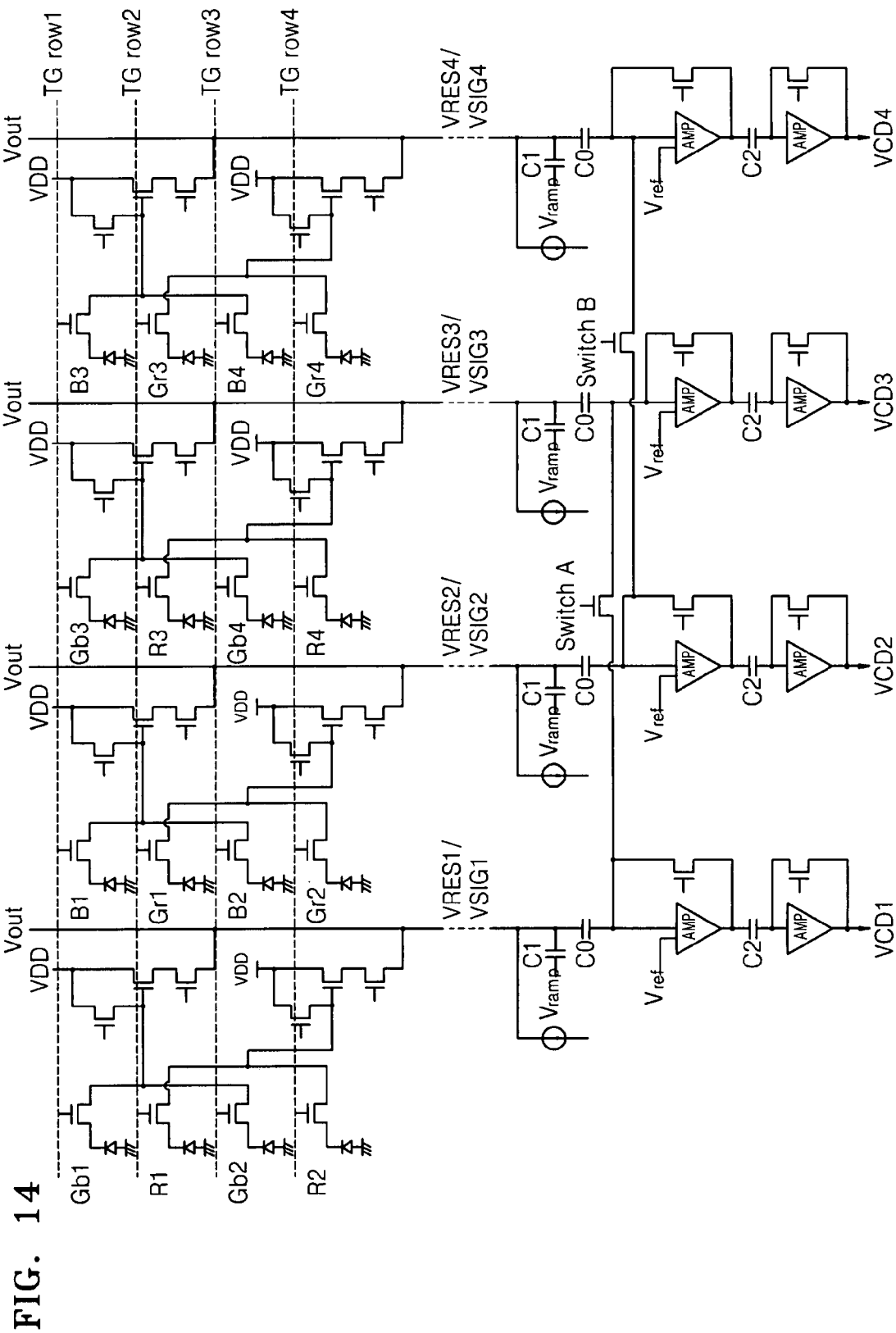
FIG. 14 is an example circuit diagram of the APS array and the analog averaging unit of FIG. 3, according to an embodiment of the present invention.
Figure 15:
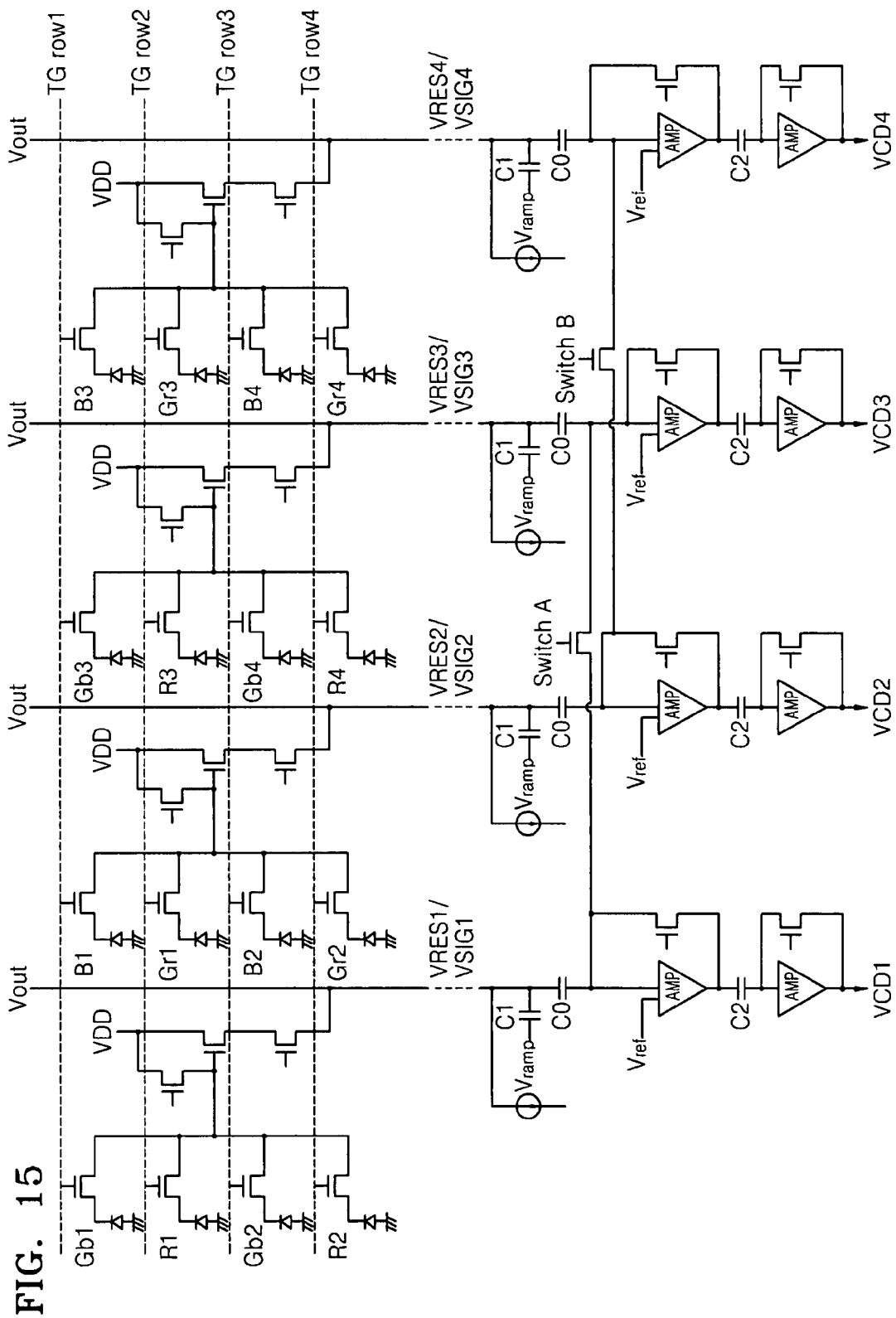
FIG. 15 is another example circuit diagram of the APS array and the analog averaging unit of FIG. 3, according to another embodiment of the present invention.

FIGS. 14 and 15 show circuit diagrams for example implementations of the APS array 210 and the analog averaging unit 231 forming respective solid state image sensing devices. The solid state image sensing device of FIG. 14 includes the APS array 210 (upper portion of FIG. 14) similarly as illustrated in FIG. 4 and includes the analog averaging unit 231 (bottom portion of FIG. 14) similarly as illustrated in FIG. 8. The solid state image sensing device of FIG. 15 includes the APS array 210 (upper portion of FIG. 15) similarly as illustrated in FIG. 6 and includes the analog averaging unit 231 (bottom portion of FIG. 15) similarly as illustrated in FIG. 8.

Operation of the solid state image sensing device of FIG. 14 is now described for the first and third columns of the APS array generating the reset/image signals VRES1/SIG1 and VRES3/SIG3.

Referring to FIG. 14, a first reset signal VRES1 and a first image signal VSIG1 are output from the first column of the APS array 210. The respective CDS unit coupled to the first column of the APS array processes such signals VRES1 and VSIG1 to generate a respective pulse width signal VCD1. In addition, a second reset signal VRES3 and a second image signal VSIG3 are output from the third column of the APS array 210. The respective CDS unit coupled to the third column of the APS array processes such signals VRES3 and VSIG3 to generate a respective pulse width signal VCD3.

During a normal mode of operation such as to capture a still image for example, the APS array 210 is driven with control signals similarly as illustrated in FIG. 5A. That is, the first reset signal VRES1 and the first image signal VSIG1 are provided to the respective CDS unit from each of the pixels disposed in the first column separately and in sequence. Similarly, the second reset signal VRES3 and the second image signal VSIG3 are provided to the respective CDS unit from each of pixels disposed in the third column separately and in sequence.

In addition, during the normal mode of operation, the analog averaging unit 231 of FIG. 14 is driven with control signals similarly as illustrated in FIG. 9A. That is, a mode switch A disposed between the respective CDS units of the first and third columns of the APS array 210 is opened. Similarly, a mode switch B disposed between the respective CDS units of the second and fourth columns of the APS array 210 is opened.

Accordingly, the respective CDS unit for the first column of the APS array 210 receives the first reset signal VRES1 and the first image signal VSIG1 from each of the pixels of the first column separately and sequentially and generates a respective pulse width signal for each of such pixels of the first column. Likewise, the respective CDS unit for the third column of the APS array 210 receives the second reset signal VRES3 and the second image signal VSIG3 from each of the pixels of the third column separately and sequentially and generates a respective pulse width signal for each of such pixels of the third column.

On the other hand, during a sub-sampling mode of operation for capturing an image with lower resolution such as for capturing a moving picture for example, the APS array 210 is driven with control signals similarly as illustrated in FIG. 5B. Thus, photocurrents of two pixels for sensing the same color in the first column of the APS array 210 are summed for generating the first reset signal VRES1 and the first image signal VSIG1 to the respective CDS unit of the first column. For example, the photocurrents of the pixels sensing the green color (designated Gb1 and Gb2 in FIG. 14) in the first column are summed. Additionally for example, the photocurrents of the pixels sensing the red color (designated R1 and R2 in FIG. 14) in the first column are summed.

The first reset signal VRES1 and the first image signal VSIG1 generated by such summing of the photocurrents are provided to the respective CDS unit. Similarly, photocurrents of pixels sensing the same color in the third column of the APS array 210 are summed to generate the second reset signal VRES3 and the second image signal VSIG3 to the respective CDS unit of the third column.

Furthermore in the sub-sampling mode, the analog averaging unit 231 of FIG. 14 is driven with control signals similarly as illustrated in FIG. 9B. Thus, the mode switches A and B are closed. In that case, at least one of the respective CDS units coupled to the first and third columns of the APS array 210 is selected to generate a pulse width signal indicating an average of a first difference (VRES1–VSIG1) between the first reset signal VRES1 and the first image signal VSIG1 and a second difference (VRES3–VSIG3) between the second reset signal VRES3 and the second image signal VSIG3.

Similarly, the solid state image sensing device of FIG. 15 has the APS array 210 driven with control signals as illustrated in FIG. 7A and has the analog averaging unit 231 driven with control signals as illustrated in FIG. 9A, during the normal mode of operation. On the other hand, the solid state image sensing device of FIG. 15 has the APS array 210 driven with control signals as illustrated in FIG. 7B and has the analog averaging unit 231 driven with control signals as illustrated in FIG. 9B, during the sub-sampling mode of operation. Operation of the solid state image sensing device of FIG. 15 would then be apparent to one of ordinary skill of the art from the description herein.

Figure 16A:
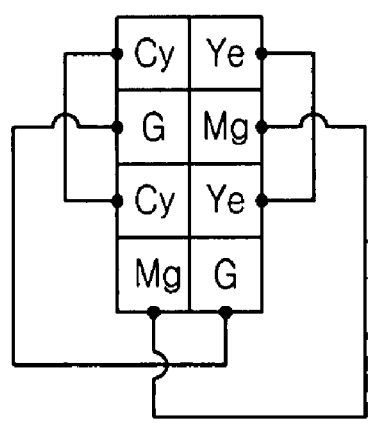
FIGS. 16A, 16B, and 17 illustrate example color patterns of the APS array of FIG. 3, according to an embodiment of the present invention.
Figure 16B:
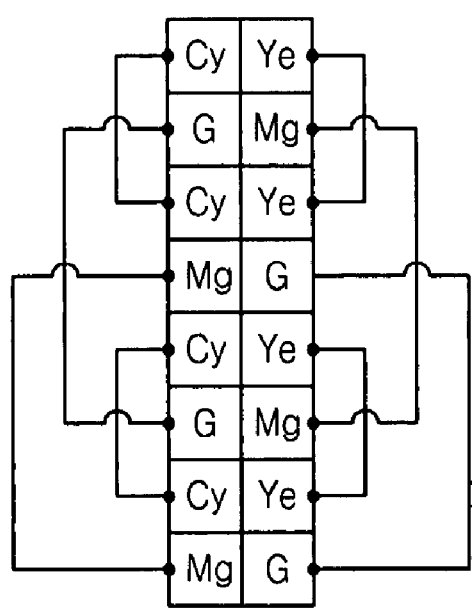
Figure 17:
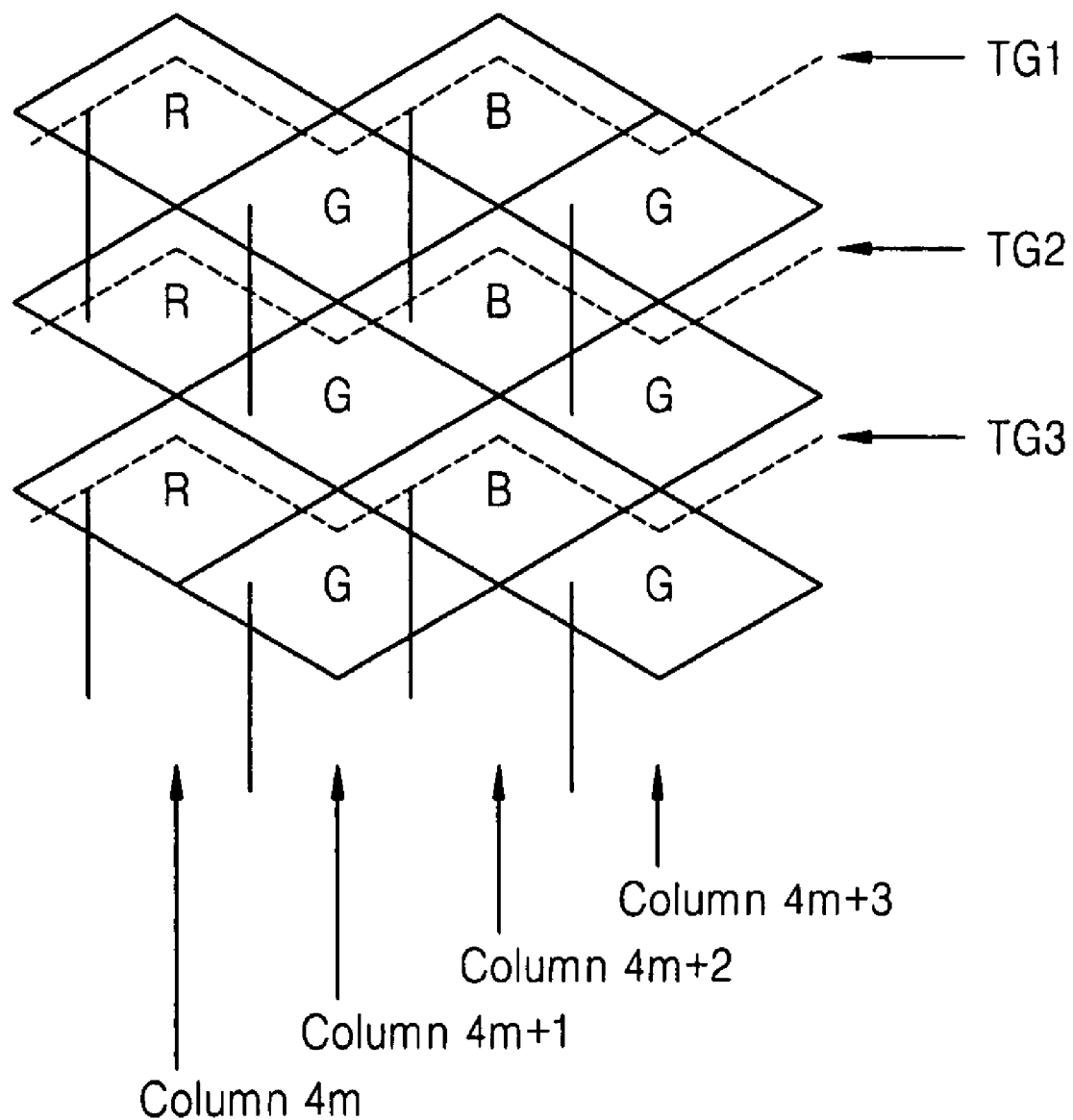

The present invention has been described with the APS array 210 of FIG. 3 having a Bayer color pattern. However, the present invention may also be practiced with the APS array 210 having other color patterns such as illustrated in FIGS. 16A, 16B, and 17. FIGS. 16A and 16B illustrate a complementary color pattern for the APS array 210 with Cy denoting the cyan color, Ye denoting the yellow color, G denoting the green color, and Mg denoting the magenta color. The complementary color pattern for an APS array is individually and in general known to one of ordinary skill in the art.

As described above, the APS array 210 of FIG. 3 operates to connect the pixels sensing the same color to the same signal converter for summation of the photocurrents of such pixels during the sub-sampling mode. FIGS. 16A and 16B illustrate such connection of example pixels for sensing respective same colors during the sub-sampling mode.

Referring to FIG. 16A, the pixels sensing the Cy color may be easily connected to one signal converter in one column (for example, first column). In addition, the pixels sensing the Ye color may be easily connected to one signal converter in one column (for example, second column). However, the pixels sensing the G color are separated further from each other, but such G pixels in adjacent columns may be connected to one signal converter.

Likewise in FIG. 16A, the pixels sensing the Mg color in adjacent columns may be connected to one signal converter. Alternatively referring to FIG. 16B, the pixels sensing the G color separated by three other pixels in one column may be connected to one signal converter, and the pixels sensing the Mg color separated by three other pixels in one column may be connected to one signal converter.

FIG. 17 illustrates the example of the APS array 210 having a honeycomb color pattern. The honeycomb color pattern for an APS array is individually and in general known to one of ordinary skill in the art. Referring to FIG. 17, pixels sensing the same color are disposed along one column. Thus, two or more pixels sensing the same color along one column may be connected to one signal converter. In FIG. 17, the dashed zagged lines indicate rows of pixels being driven with transfer control signals TG1, TG2, and TG3 respectively.

While the present invention has been particularly shown and described with reference to exemplary embodiments thereof, it will be understood by those of ordinary skill in the art that various changes in form and details may be made therein without departing from the spirit and scope of the present invention as defined by the following claims.

Thus, the foregoing is by way of example only and is not intended to be limiting. For example, any numbers of elements or circuit topology illustrated and described herein are by way of example only. In addition, the present invention has been described for a CMOS image sensor. However, the present invention may also be used for any other type of image sensors. Furthermore, any type of switching element may be used for any of the MOSFETs illustrated herein. The present invention is limited only as defined in the following claims and equivalents thereof.

What is claimed is:

1. A solid-state image-sensing device comprising:
   a pixel array including a matrix of pixels and having a respective output line for each of a plurality of pixel groupings; and
   an averaging unit receiving respective signals from first and second output lines of the pixel array to generate a pulse width signal that indicates an average of said respective signals;
   wherein the pixel array includes a first signal converter for generating a respective signal of the first output line from combining photocurrents from a first set of at least two pixels sensing a same first color within the pixel array,
   and wherein the first signal converter is disposed within the pixel array and is separate from the averaging unit that further averages the respective signals of the first and second output lines.

2. The solid-state image-sensing device of claim 1, further comprising:
   a digital signal output unit that generates a digital value corresponding to when the pulse width signal has a logical transition,
   wherein the averaging unit and the digital signal output unit are separate from and disposed outside of the pixel array.

3. The solid-state image-sensing device of claim 1, wherein the solid-state image-sensing device further includes:
   a driver that controls switching elements in the first set of pixels for simultaneously coupling a respective photocurrent from a respective photodiode for each pixel of the first set to the first signal converter that generates the respective signal of the first output line during a sub-sampling mode.

4. The solid-state image-sensing device of claim 3, wherein the first output line generates a first reset signal and a first image signal, and wherein the second output line generates a second reset signal and a second image signal, and wherein the pulse width signal indicates an average of a first difference between the first reset signal and the first image signal and a second difference between the second reset signal and the second image signal, during the sub-sampling mode.

5. The solid-state image-sensing device of claim 4, wherein the respective photocurrents from the pixels of the first set are summed at different time points with different configuration of the pixels of the first set for generating the first reset signal and the first image signal during the sub-sampling mode.

6. The solid-state image-sensing device of claim 3, wherein the first set includes two pixels that are non-adjoining in a same column of the pixel array with another pixel for sensing a different color from the first color being disposed between said two pixels.

7. The solid-state image-sensing device of claim 3, wherein the pixel array further includes a second set of at least two pixels sensing a second color and coupled to the first signal converter, and wherein the driver controls respective switching elements in the second set of pixels for simultaneously coupling a respective photocurrent from a respective photodiode for each pixel of the second set to the first signal converter during the sub-sampling mode.

8. The solid-state image-sensing device of claim 7, wherein the pixel array has a Bayer color pattern, and wherein the pixels from the first set and the pixels from the second set alternate along a column of the pixel array.

9. The solid-state image-sensing device of claim 3, wherein the driver controls the respective switching elements in the first set of pixels for separately coupling the respective photocurrent from the respective photodiode for each pixel of the first set to the first signal converter, during a normal mode of operation.

10. The solid-state image-sensing device of claim 9, wherein the driver operates in the sub-sampling mode for capturing a moving image, and operates in the normal mode for capturing a still image.

11. The solid-state image-sensing device of claim 9, wherein the driver operates in the sub-sampling mode for capturing a moving image or a still image.

12. The solid-state image-sensing device of claim 9, wherein the pixel array further includes:
a second set of pixels for sensing a second color; and
a second signal converter coupled to the pixels of the second set;
wherein the driver controls switching elements in the second set of pixels for simultaneously coupling a respective photocurrent from a respective photodiode for each pixel of the second set to the second signal converter that generates the respective signal of the second output line during the sub-sampling mode;
and wherein the driver controls the respective switching elements in the second set of pixels for separately coupling the respective photocurrent from the respective photodiode for each pixel of the second set to the second signal converter that generates the respective signal of the second output line during a normal mode of operation.

13. The solid-state image-sensing device of claim 12, wherein the averaging unit includes:
a first correlated double sampling (CDS) unit coupled to the first output line and having a first set of amplifiers and capacitors;
a second correlated double sampling (CDS) unit coupled to the second output line and having a second set of amplifiers and capacitors; and
a mode switch that electrically couples inputs between the first and second sets of amplifiers during the sub-sampling mode and that disconnects said inputs between the first and second sets of amplifiers during the normal mode.

14. The solid-state image-sensing device of claim 13, wherein the averaging unit further includes:
a plurality of switches for configuring the first and second sets of amplifiers and capacitors such that the pulse width signal that indicates the average of said respective signals is generated by at least one of the first and second CDS units during the sub-sampling mode, and such that a separate respective pulse width signal is generated by each of the first and second CDS units during the normal mode.

15. The solid-state image-sensing device of claim 14, wherein one of the first and second sets of amplifiers is selected to operate for generating said pulse width signal during the sub-sampling mode.

16. The solid-state image-sensing device of claim 13, wherein the first set of pixels are along a first column of the pixel array, and wherein the second set of pixels are along a second column that is one column away from the first column in the pixel array.

17. The solid-state image-sensing device of claim 1, wherein the averaging unit includes:
a first correlated double sampling (CDS) unit coupled to the first output line and having a first set of amplifiers and capacitors;
a second correlated double sampling (CDS) unit coupled to the second output line and having a second set of amplifiers and capacitors; and
a mode switch that electrically couples inputs between the first and second sets of amplifiers during a sub-sampling mode and that disconnects said inputs between the first and second sets of amplifiers during a normal mode.

18. The solid-state image-sensing device of claim 17, wherein the averaging unit further includes:
a plurality of switches for configuring the first and second sets of amplifiers and capacitors such that the pulse width signal that indicates the average of said respective signals is generated by at least one of the first and second CDS units during the sub-sampling mode, and such that a separate respective pulse width signal is generated by each of the first and second CDS units during the normal mode.

19. The solid-state image-sensing device of claim 17, wherein the respective photocurrents of the pixels of the first set are combined for generating the respective signal on the first output line during the sub-sampling mode, and wherein the respective photocurrents of the pixels of the first set are separately used for generating the respective signal on the first output line during the normal mode.

20. The solid-state image-sensing device of claim 17, wherein one of the first and second sets of amplifiers is selected to operate for generating said pulse width signal during the sub-sampling mode.

21. The solid-state image-sensing device of claim 1, wherein the pixel array has a Complementary color pattern with the pixels of the first set being non-adjoining in a column with another two pixels for sensing complementary colors being alternately disposed with the pixels of the first set.

22. The solid-state image-sensing device of claim 1, wherein the pixel array has a Honeycomb color pattern with the pixels of the first set being disposed along one column of the pixel array.

23. The solid-state image-sensing device of claim 1, wherein the solid-state image-sensing device is a CMOS (complementary metal oxide semiconductor) image sensor.

* * * * *